United States Patent
Iida et al.

(10) Patent No.: US 7,629,770 B2
(45) Date of Patent: Dec. 8, 2009

(54) DEVICE AND METHOD FOR CONTROLLING OUTPUT FROM A RECHARGEABLE BATTERY

(75) Inventors: Takuma Iida, Osaka (JP); Nobuyasu Morishita, Aichi (JP)

(73) Assignee: Panasonic EV Energy Co., Ltd., Kosai-Shi (JP)

( * ) Notice: Subject to any disclaimer, the term of this patent is extended or adjusted under 35 U.S.C. 154(b) by 287 days.

(21) Appl. No.: 11/565,423

(22) Filed: Nov. 30, 2006

(65) Prior Publication Data

US 2007/0126404 A1    Jun. 7, 2007

(30) Foreign Application Priority Data

Dec. 2, 2005    (JP) .............................. 2005-350033

(51) Int. Cl.
    H02J 7/00    (2006.01)
(52) U.S. Cl. ....................................... 320/134; 320/135
(58) Field of Classification Search ................. 320/134, 320/135

See application file for complete search history.

(56) References Cited

U.S. PATENT DOCUMENTS

| 6,194,868 B1* | 2/2001 | De Boer ...................... 320/132 |
| 2005/0104558 A1* | 5/2005 | Murakami et al. .......... 320/125 |

FOREIGN PATENT DOCUMENTS

JP    2003-199258    7/2003

* cited by examiner

*Primary Examiner*—Edward Tso
*Assistant Examiner*—Samuel Berhanu
(74) *Attorney, Agent, or Firm*—Workman Nydegger

(57) ABSTRACT

A controller for a rechargeable vehicle battery that prevents drivability from being lowered. The controller includes a voltage measurement unit for measuring terminal voltage of the rechargeable battery and a control unit for setting a plurality of output maximum voltages, each indicating an upper limit for discharge power allowed to be output from the rechargeable battery during a predetermined time. The control unit compares the measured terminal voltage of the rechargeable battery with a plurality of reference voltages respectively corresponding to the plurality of output maximum values. The control unit simultaneously lowers each of the output maximum values or sequentially lowers the output maximum values from the highest one of the output maximum values based on the comparison result.

14 Claims, 10 Drawing Sheets

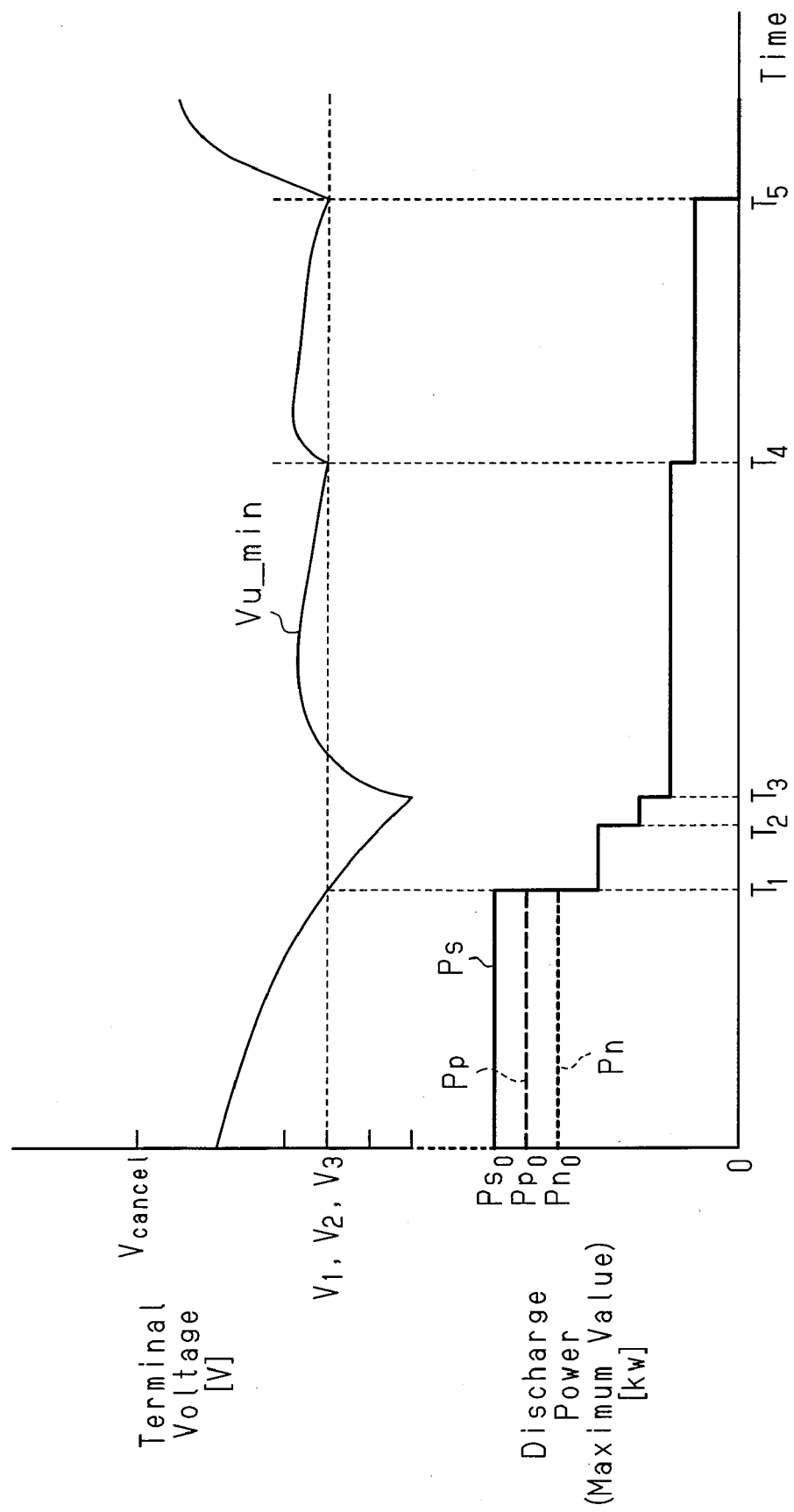

DEVICE AND METHOD FOR CONTROLLING OUTPUT FROM A RECHARGEABLE BATTERY

CROSS-REFERENCE TO RELATED APPLICATIONS

This application is based upon and claims the benefit of priority from the prior Japanese Patent Application No. 2005-350033, filed on Dec. 2, 2005, the entire contents of which are incorporated herein by reference.

BACKGROUND OF THE INVENTION

The present invention relates to a device and method for controlling output from a rechargeable battery.

In recent years, rechargeable batteries have been combined with fuel cells, solar cells, or power generators to form power supply systems. A power generator is driven by natural power, such as wind power or water power, or by artificial power, such as power generated by an internal combustion engine. A power supply system using a rechargeable battery stores excess power in the rechargeable battery to improve energy efficiency.

An example of a power supply system is a hybrid electric vehicle (HEV) using an engine and a motor as its power sources. When the engine outputs more power than necessary to drive the vehicle, the HEV drives its generator using the excessive power to charge the rechargeable battery. When the vehicle is braking or decelerating, the HEV drives the motor with the vehicle wheels and charges the rechargeable battery using the motor as a power generator. When the output from the engine is small, the HEV compensates for the lack of power by discharging the rechargeable battery and driving the motor.

In this way, the HEV accumulates energy in the rechargeable battery. Conventional automobiles release such energy into the atmosphere as heat. The energy efficiency of an HEV is higher than the energy efficiency of a conventional automobile. Thus, the HEV greatly improves fuel efficiency as compared with conventional automobiles.

To efficiently charge excess power into the rechargeable battery of the HEV, the rechargeable battery is controlled in a manner that its state of charge (SOC) does not reach 100%. To drive the motor when necessary, the rechargeable battery is also controlled in a manner that its SOC does not reach zero. More specifically, the rechargeable battery is normally controlled in a manner that the SOC varies within a range of 20 to 80%.

A rechargeable battery installed in the HEV or other power supply systems may be formed by connecting a plurality of battery cells (cells) in series. In this case, the rechargeable battery may be overdischarged due to variations in the capacities of the battery cells. When a battery cell having a small capacity is overdischarged, a polarity reversal may occur. This shortens the life of the rechargeable battery.

To prevent such a polarity reversal from occurring, output from the rechargeable battery may be restricted when the terminal voltage of the rechargeable battery falls and becomes equal to a predetermined value or less. For example, Japanese Laid-Open Patent Publication No. 2003-199258 (FIGS. 3 and 4) describe a controller (hereafter referred to as a "battery ECU") for controlling output from a rechargeable battery. The battery ECU sets a maximum value to limit the discharge power that can be output from the rechargeable battery. Then, the battery ECU transmits the set output maximum value to a vehicle controller (hereafter referred to as a "vehicle ECU"). As a result, when driving the motor, the vehicle ECU drives restricts the output from the rechargeable battery so that the output does not exceed the maximum value.

The vehicle ECU requests the rechargeable battery for output that differs in accordance with the conditions of the vehicle. For example, in comparison to when the vehicle is being driving in a stable state, the vehicle ECU requests the rechargeable battery for a higher output within a shorter period of time when the vehicle starts to move or when a gear is changed. Therefore, if the maximum output value were to be set based on a stable traveling state, high output during a short period of time would not be allowed. This increases the load on the engine.

Accordingly, in the above publication, the battery ECU sets two types of output maximum values. Further, in addition to the process for restricting output from the rechargeable battery, the battery ECU performs processes, such as the calculation of the state of charge (SOC), output of the calculated SOC, determination of deterioration of the rechargeable battery, and output of the determination result.

FIG. 1 is a timing chart showing the control of output from the rechargeable battery. In FIG. 1, the vertical axis represents the terminal voltage Vb and output maximum values Pp and Pn (maximum values of discharge power) and the horizontal axis represents time.

As shown in FIG. 1, the battery ECU (not shown) sets the short-time output maximum value Pp and a long-time output maximum value Pn. The short-time output maximum value Pp represents the maximum value of the discharge power when the vehicle requests for a high output during a short period of time (for example, two seconds). The long-time output maximum value Pn represents the maximum value of the discharge power when the vehicle is being driving in a stable state. In a normal state, the short-time output maximum value Pp is set at 28 kW and the long-time output maximum value Pn is set at 20 kW. That is, the short-time output maximum value Pp is greater than the long-time output maximum value Pn. This enables the vehicle ECU to drive the motor when the vehicle starts to move or when a gear is changed.

In the example of FIG. 1, the battery ECU lowers the short-time output maximum value Pp and the long-time output maximum value Pn to prevent polarity reversal of the rechargeable battery. More specifically, the battery ECU lowers the long-time output maximum value Pn when the terminal voltage Vb decreases to, for example, 12 V. The lowering of the long-time output maximum value Pn is performed in a graded manner in accordance with decrease in the terminal voltage Vb. Further, the battery ECU also lowers the short-time output maximum value Pp.

The lowering of the short-time output maximum value Pp is first performed when the terminal voltage Vb decreases to, for example, 9.6 V. At the same time, the short-time output maximum value Pp is lowered to be substantially the same as the long-time output maximum value Pn. Further, even if the terminal voltage Vb increases again and exceeds 12 V, the battery ECU lowers the short-time output maximum value Pp and the long-time output maximum value Pn if the terminal voltage Vb decreases again to 12.0 V during a certain period.

The two types of output maximum values are set in this manner in the example of FIG. 1. Thus, the motor is effectively driven when the vehicle starts to move or when a gear is changed. This also prevents a polarity reversal from occurring.

However, in the example of FIG. 1, the terminal voltage at which the lowering of the short-time output maximum value Pp is started is lower than the terminal voltage at which the lowering of the long-time output maximum value Pn is started. Thus, when the lowering of the short-time output maximum value Pp starts, the difference between the short-time output maximum value Pp and the long-time output maximum value Pn increases.

Thus, in the example of FIG. 1, the discharge power of the rechargeable battery may suddenly be restricted when the output request to the battery ECU is shifted from high output to normal output within a short period of time. This lowers drivability of an HEV.

SUMMARY OF THE INVENTION

The present invention provides a rechargeable battery controller and a rechargeable battery output control method that prevent the discharge power of a rechargeable battery from suddenly being restricted.

BRIEF DESCRIPTION OF THE DRAWINGS

The invention, together with objects and advantages thereof, may best be understood by reference to the following description of the presently preferred embodiments together with the accompanying drawings in which:

FIG. 11 is a timing chart showing the terminal voltage of battery blocks included in the rechargeable battery of FIG. 9, the ultra short-time output maximum value, the short-time output maximum value, and the long-time output maximum value.

DETAILED DESCRIPTION OF THE PREFERRED EMBODIMENTS

Figure 1:
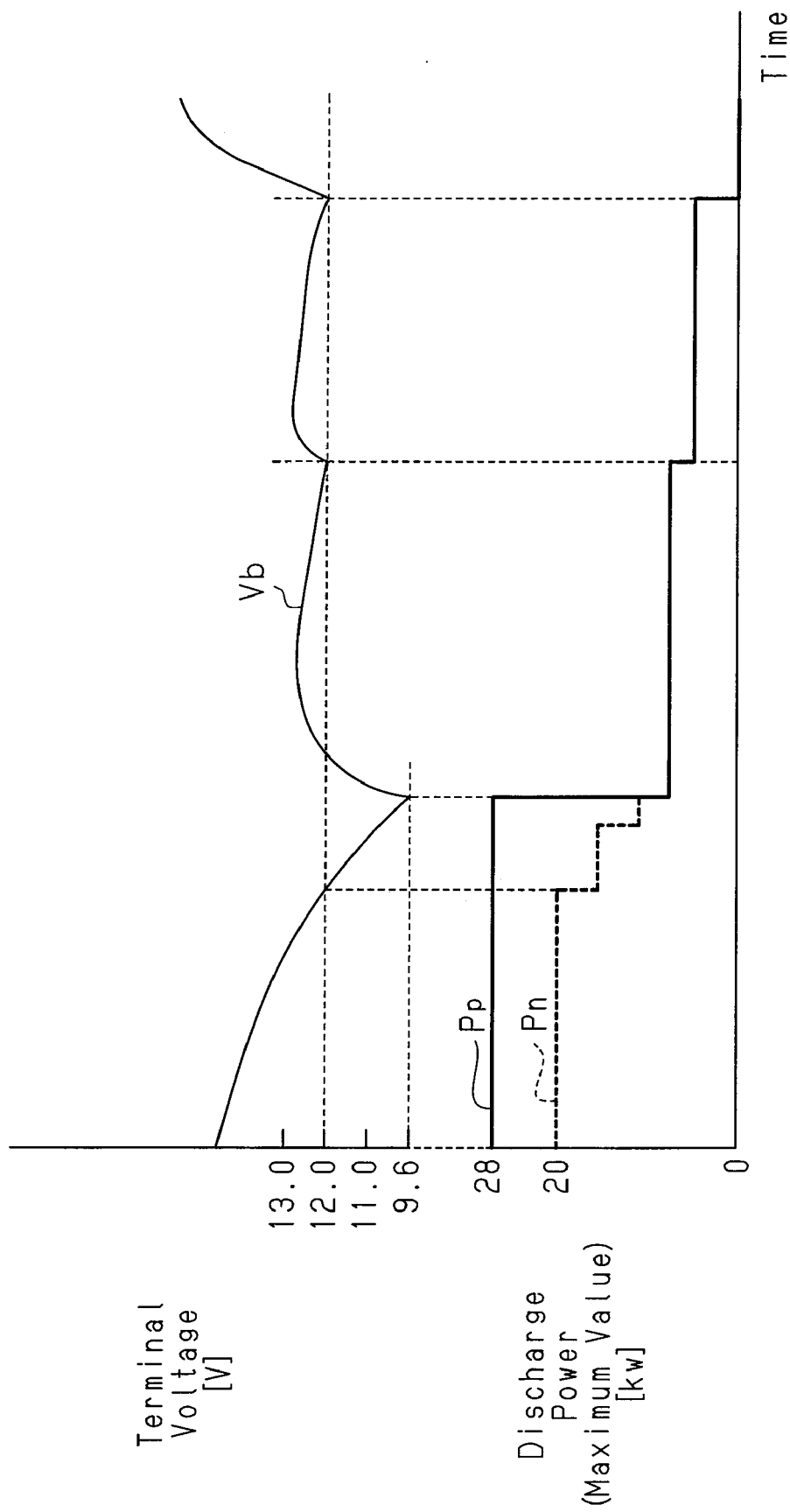
FIG. 1 is a timing chart showing output control of a rechargeable battery in the prior art.

In the drawings, like numeral are used for like elements throughout.

One aspect of the present invention is a controller for controlling output of discharge power from a rechargeable battery. The controller includes a voltage measurement unit for measuring terminal voltage of the rechargeable battery. A control unit sets a plurality of output maximum values, each indicating an upper limit for discharge power allowed to be output from the rechargeable battery during a predetermined time. The control unit compares the measured terminal voltage of the rechargeable battery with a plurality of reference voltages respectively corresponding to the plurality of output maximum values. The control unit is configured to substantially simultaneously lower each of the output maximum values or sequentially lower the output maximum values from the highest one of the output maximum values based on the comparison result.

The control unit is configured to lower each output maximum value when the terminal voltage of the rechargeable battery decreases to the corresponding reference voltage. There are an n number of the plurality of output maximum values and an n number of the plurality of reference voltages, where n>2 is satisfied. The n number of the output maximum values are set as $P_1, P_2, \ldots, P_n$ in order from shortest to longest of predetermined times and satisfy $P_1 > P_2, \ldots, > P_n$. The n number of the reference voltages are set as $V_1, V_2, \ldots, V_n$ in order from largest to smallest of the output maximum values and satisfy $V_1 \geqq V_2, \ldots, \geqq V_n$.

The controller is connected to a device using the rechargeable battery, and the control unit transmits the plurality of output maximum values to the device.

The controller is for installation in a vehicle using an internal combustion engine and a motor as a power source, and the rechargeable battery is installed in the vehicle and discharges power supplied to the motor.

The plurality of output maximum values includes a first output maximum value, which is an upper limit for discharge power allowed to be output from the rechargeable battery during a first predetermined time, and a second output maximum value, which is smaller than the first output maximum value and which is an upper limit for discharge power allowed to be output from the rechargeable battery during a second predetermined time longer than the first predetermined time. The plurality of reference voltages includes a first reference voltage, which corresponds to the first output maximum value, and a second reference voltage, which corresponds to the second output maximum value and is less than or equal to the first reference voltage.

The control unit sets an initial value for the first output maximum value and an initial value for the second output maximum value, which is smaller than the initial value of the first output maximum value. The control unit lowers the first output maximum value to the second output maximum value when the terminal voltage of the rechargeable battery decreases to the first reference voltage.

The control unit sets an initial value for the first output maximum value and an initial value for the second output maximum value, which is smaller than the initial value of the first output maximum value, and lowers the first output maximum value in a graded manner when the terminal voltage of the rechargeable battery decreases to the first reference voltage.

The control unit lowers the first output maximum value to a value equal to the second output maximum value when the terminal voltage of the rechargeable battery decreases to the second reference voltage.

The control unit cancels graded lowering of the first output maximum value and lowers the first output maximum value to a value equal to the second output maximum value before the terminal voltage of the rechargeable battery decreases to the second reference voltage.

The controller further includes a temperature measurement unit for measuring temperature of the rechargeable battery.

The control unit is configured to set the plurality of output maximum values according to the temperature measured by the temperature measurement unit.

The control unit obtains a state of charge of the rechargeable battery and sets the plurality of output maximum values according to the obtained state of charge.

The rechargeable battery includes a plurality of battery blocks that are electrically connected in series. Each battery block includes a plurality of cells that are electrically connected in series. The voltage measurement unit measures terminal voltage of each battery block. The control unit is configured to lower the first output maximum value when a smallest one of the terminal voltages of the battery blocks decreases to the first reference voltage and lowers the second output maximum value when the smallest one of the terminal voltages decreases to the second reference voltage.

Another aspect of the present invention is a method for controlling output of discharge power from a rechargeable battery. The method includes measuring terminal voltage of the rechargeable battery and setting a plurality of output maximum values, each indicating an upper limit for discharge power allowed to be output from the rechargeable battery during a predetermined time. The method also includes comparing the terminal voltage of the rechargeable battery with a plurality of reference voltages respectively corresponding to the plurality of output maximum values and substantially simultaneously lowering each of the output maximum values or sequentially lowering the output maximum values from the highest one of the output maximum values based on the comparison result.

There are an n number of the plurality of output maximum values and an n number of the plurality of reference voltages, where n>2 is satisfied. The setting a plurality of different output maximum values includes setting the n number of the output maximum values as $P_1, P_2, \ldots, P_n$ in order from shortest to longest of predetermined times so as to satisfy $P_1 > P_2, \ldots, > P_n$. The method further includes acquiring the n number of the reference voltages set as $V_1, V_2, \ldots, V_n$ in order from largest to smallest of the output maximum values so as to satisfy $V_1 \geq V_2, \ldots, \geq V_n$.

The rechargeable battery is installed in a vehicle having an internal combustion engine and a motor as a power source. The setting a plurality of output maximum values includes setting the plurality of output maximum values as upper limits for the discharge power allowed to be output from the rechargeable battery to the motor.

The setting a plurality of output maximum values includes setting a first output maximum value, which is an upper limit for discharge power allowed to be output from the rechargeable battery during a first predetermined time, and a second output maximum value, which is smaller than the first output maximum value and which is an upper limit for discharge power allowed to be output from the rechargeable battery during a second predetermined time that is longer than the first predetermined time. The method further includes acquiring the plurality of reference voltages that include a first reference voltage, which corresponds to the first output maximum value, and a second reference voltage, which corresponds to the second output maximum value and is less than or equal to the first reference voltage.

A further aspect of the present invention is a computer-readable product encoded with program instructions for execution by a computer for controlling output of discharge power from a rechargeable battery. The program instructions when executed by a computer perform steps including measuring terminal voltage of the rechargeable battery, setting a plurality of output maximum values, each indicating an upper limit for discharge power allowed to be output from the rechargeable battery during a predetermined time, comparing the terminal voltage of the rechargeable battery with a plurality of reference voltages respectively corresponding to the plurality of output maximum values, and simultaneously lowering each of the output maximum values or sequentially lowering the output maximum values from the highest one of the output maximum values based on the comparison result.

The present invention may be a computer-readable product encoded with program instructions embodying the method for controlling output of discharge power from a rechargeable battery as described above. The method of the present invention is performed by installing the program in a computer.

A controller 1 for a rechargeable battery 10 and an output control method for the rechargeable battery 10 according to a first embodiment of the present invention will now be described with reference to FIGS. 2 to 5. The structure of the controller 1 of the first embodiment will first be described with reference to FIG. 2.

As shown in FIG. 1, the controller 1 of the first embodiment controls the rechargeable battery 10 that is installed in an HEV (hybrid electric vehicle). The rechargeable battery 10 supplies power to a motor (not shown) functioning as a power source of the HEV and a starter motor of an internal combustion engine mounted on the HEV. The rechargeable battery 10 also supplies power to any other part of the HEV requiring power.

In the first embodiment, the rechargeable battery 10 includes battery blocks $B_1$ to $B_{20}$ that are electrically connected in series. The battery blocks $B_1$ to $B_{20}$ are accommodated in a battery case 12. Each of the battery blocks $B_1$ to $B_{20}$ includes two battery modules that are electrically connected in series. Each battery module includes six cells 11 that are electrically connected in series. Nickel-metal hydride batteries or lithium ion batteries may be used as the cells 11. The quantities of the battery blocks, the battery modules, and the cells 11 are not limited in any manner. The structure of the rechargeable battery 10 is also not limited in any manner.

A plurality of temperature sensors 6 are arranged in the battery case 12. The battery blocks in the battery case 12 of the rechargeable battery 10 are divided into a plurality of groups. Each temperature sensor 6 is associated with one of the battery block groups. Each group includes one battery block or a plurality of battery blocks. When one group includes a plurality of battery blocks, the difference in temperature between the battery blocks is relatively small in the group. When one group includes one battery block, the difference in temperature between that battery block in the group and other battery blocks is relatively large. The battery blocks are divided into groups based on the temperatures measured in advance through experiments or the like.

Figure 2:
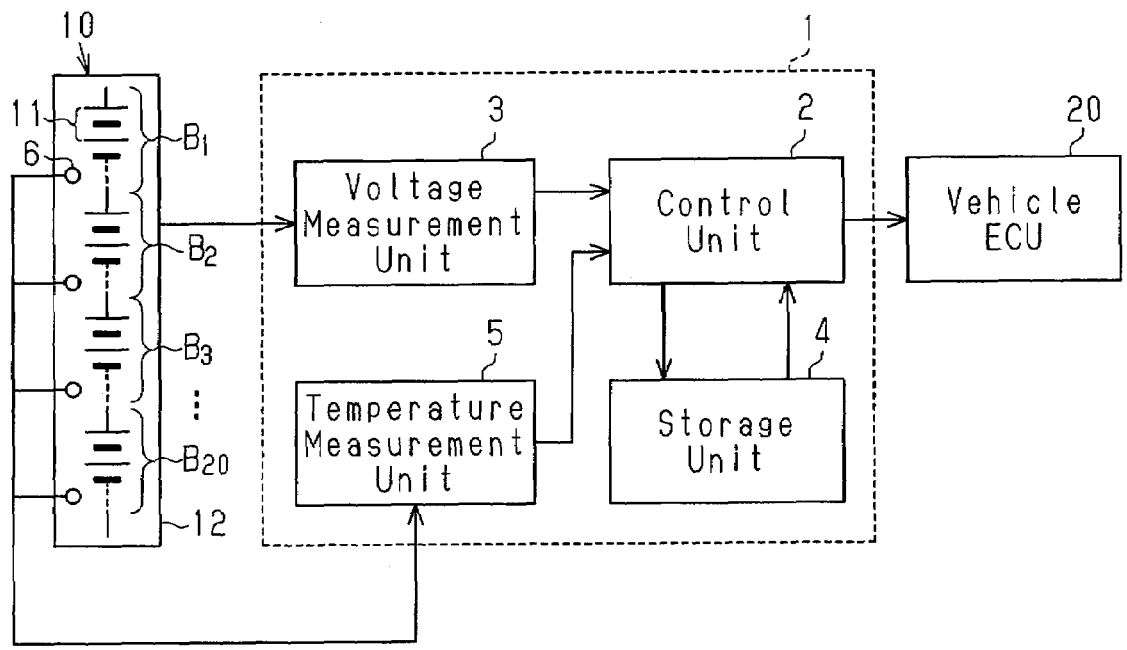
FIG. 2 is a schematic block diagram of a controller for a rechargeable battery according to a first embodiment of the present invention.

A vehicle ECU 20 shown in FIG. 2 controls a drive motor and an engine mounted on the vehicle and further controls an air conditioner and various measuring instruments installed in the vehicle. The vehicle ECU 20 receives short-time output information and long-time output information from the controller 1. In the first embodiment, the short-time output information specifies a short-time output maximum value Pp (hereafter referred to as "first maximum value Pp"), and the long-time output information specifies a long-time output maximum value Pn (hereafter referred to as "second maximum value Pn"). The vehicle ECU 20 drives the motor in a manner that the discharge power (output of the rechargeable battery 10) does not exceed the first and second maximum values Pp and Pn.

The controller 1 includes a control unit 2, a voltage measurement unit 3, a storage unit 4, and a temperature measurement unit 5. In the first embodiment, the controller 1 forms part of a battery ECU.

The voltage measurement unit 3 measures terminal voltage of the rechargeable battery 10. In the first embodiment, the voltage measurement unit 3 measures terminal voltages $Vu_1$ to $Vu_{20}$ of the battery blocks $B_1$ to $B_{20}$. Further, the voltage measurement unit 3 generates voltage data specifying the terminal voltages $Vu_1$ to $Vu_{20}$ and provides the voltage data to the control unit 2.

The control unit 2 stores the voltage data provided from the voltage measurement unit 3 to the storage unit 4. Further, the control unit 2 specifies the one of the terminal voltages $Vu_1$ to $Vu_{20}$ having the smallest value and being within an appropriate range as the lowest terminal voltage (minimum terminal voltage Vu_min) based on the voltage data. The voltage data is provided from the voltage measurement unit 3 to the control unit 2 in preset cycles.

The temperature measurement unit 5 measures the temperature of the rechargeable battery 10. The temperature measurement unit 5 receives an analog signal from each temperature sensor 6 arranged in the battery case 12 and converts the analog signal to a digital signal. The temperature measurement unit 5 then generates temperature data specifying the battery temperature of each battery block group based on the digital signal and provides the temperature data to the control unit 2.

The control unit 2 stores the temperature data provided from the temperature measurement unit 5 in the storage unit 4. Further, based on the temperature data, the control unit 2 determines the lowest one of the battery temperatures in all of the groups (minimum battery temperature). The temperature data is provided from the temperature measurement unit 5 to the control unit 2 in preset cycles.

The control unit 2 sets a plurality of output maximum values, each of which indicates the upper limit of the discharge power allowed to be output from the rechargeable battery 10 during a predetermined time. In the first embodiment, the control unit 2 sets two output maximum values, that is, the first maximum value Pp and the second maximum value Pn. The first maximum value Pp is stored in the storage unit 4 as short-time output information. The second maximum value Pn is stored in the storage unit 4 as long-time output information. The control unit 2 provides the short-time output information and the long-time output information to the vehicle ECU 20.

The first maximum value Pp indicates the upper limit of the discharge power allowed to be output from the rechargeable battery 10 in a first predetermined time, which is a relatively short time period of, for example, one or two seconds. For example, when the vehicle requests the rechargeable battery 10 for a high output during a short period of time, such as when the vehicle starts to move or when gears are changed, the first maximum value Pp is used to limit the discharging of the rechargeable battery. The second maximum value Pn indicates the upper limit of the discharge power allowed to be output from the rechargeable battery 10 in a second predetermined time, which is a relatively long time period of, for example, ten seconds. For example, when charging is being performed while the vehicle is being driven in a stable manner, the second maximum value Pn is used to limit the discharging of the rechargeable battery.

In the first embodiment, the control unit 2 functions in the operation modes of a limitation processing mode and a normal processing mode. In the limitation processing mode, the control unit 2 lowers the first maximum value Pp and the second maximum value Pn. In the normal processing mode, the control unit 2 does not lower the first maximum value Pp and the second maximum value Pn. The control unit 2 operates in the limitation processing mode when the minimum terminal voltage Vu_min decreases to a reference voltage $V_1$ or a reference voltage $V_2$. The control unit 2 operates in the normal processing mode when the minimum terminal voltage Vu_min exceeds the reference voltage $V_1$ and the reference voltage $V_2$.

In the normal processing mode, the control unit 2 provides the vehicle ECU 20 with an initial value of the first maximum value Pp as short-time output information and with an initial value of the second maximum value Pn as long-time output information. The control unit 2 sets the initial value of the first maximum value Pp and the initial value of the second maximum value Pn based on the temperature data provided from the temperature measurement unit 5. The setting of the initial value based on the temperature data will be described later with reference to FIG. 5.

In the limitation processing mode, the control unit 2 lowers the first maximum value Pp and the second maximum value Pn to prevent the terminal voltage of the rechargeable battery 10 (each battery block) from decreasing. More specifically, the control unit 2 resets the first maximum value Pp to lower the value when the minimum terminal voltage Vu_min decreases to the first reference voltage $V_1$. Further, the control unit 2 resets the second maximum value Pn to lower the value when the minimum terminal voltage Vu_min decreases to the second reference voltage $V_2$. After lowering the first maximum value Pp or the second maximum value Pn, the control unit 2 rewrites the short-time output information or the long-time output information corresponding to the lowered maximum value. The control unit 2 then provides the vehicle ECU 20 with the rewritten output information.

In the first embodiment, the reference voltage $V_1$ and the reference voltage $V_2$ are set to have the same value. Thus, the first maximum value Pp and the second maximum value Pn are lowered at the same time. Further, when the minimum terminal voltage Vu_min of the battery blocks increases to a cancellation voltage $V_{cancel}$, which is higher than the reference voltage $V_1$ and the reference voltage $V_2$, the control unit 2 cancels the limitation processing mode and returns to the normal processing mode.

The reference voltage $V_1$ and the reference voltage $V_2$ are not limited to the same value. The reference voltage $V_1$ may be set higher than the reference voltage $V_2$. This prevents the difference between the first maximum value and the second maximum value Pn from increasing.

In the first embodiment, the storage unit 4 stores maps showing temperatures and the corresponding optimum values of the reference voltage $V_1$ and the reference voltage $V_2$. The control unit 2 calculates an average battery temperature based on the temperature data, applies the average battery temperature to the maps, and sets the reference voltage $V_1$ and the reference voltage $V_2$. The maps are generated to reflect the performance of the rechargeable battery 10 or the load of the rechargeable battery 10 based on the results of discharging experiments conducted in advance.

The storage unit 4 stores maps for setting the initial values of the first and second maximum values Pp and Pn in addition to the maps for setting the reference voltage $V_1$ and the reference voltage $V_2$. The storage unit 4 further stores the value of the cancellation voltage $V_{cancel}$. The storage unit 4 provides the information it stores to the control unit 2 in response to an instruction from the control unit 2.

The output control method for the rechargeable battery 10 of the first embodiment will now be described with reference to FIGS. 3 to 5. The output control method of the first embodiment is executed by operating the controller 1 shown in FIG. 2. The operation of the controller 1 will be discussed with reference to FIG. 2.

Figure 3:
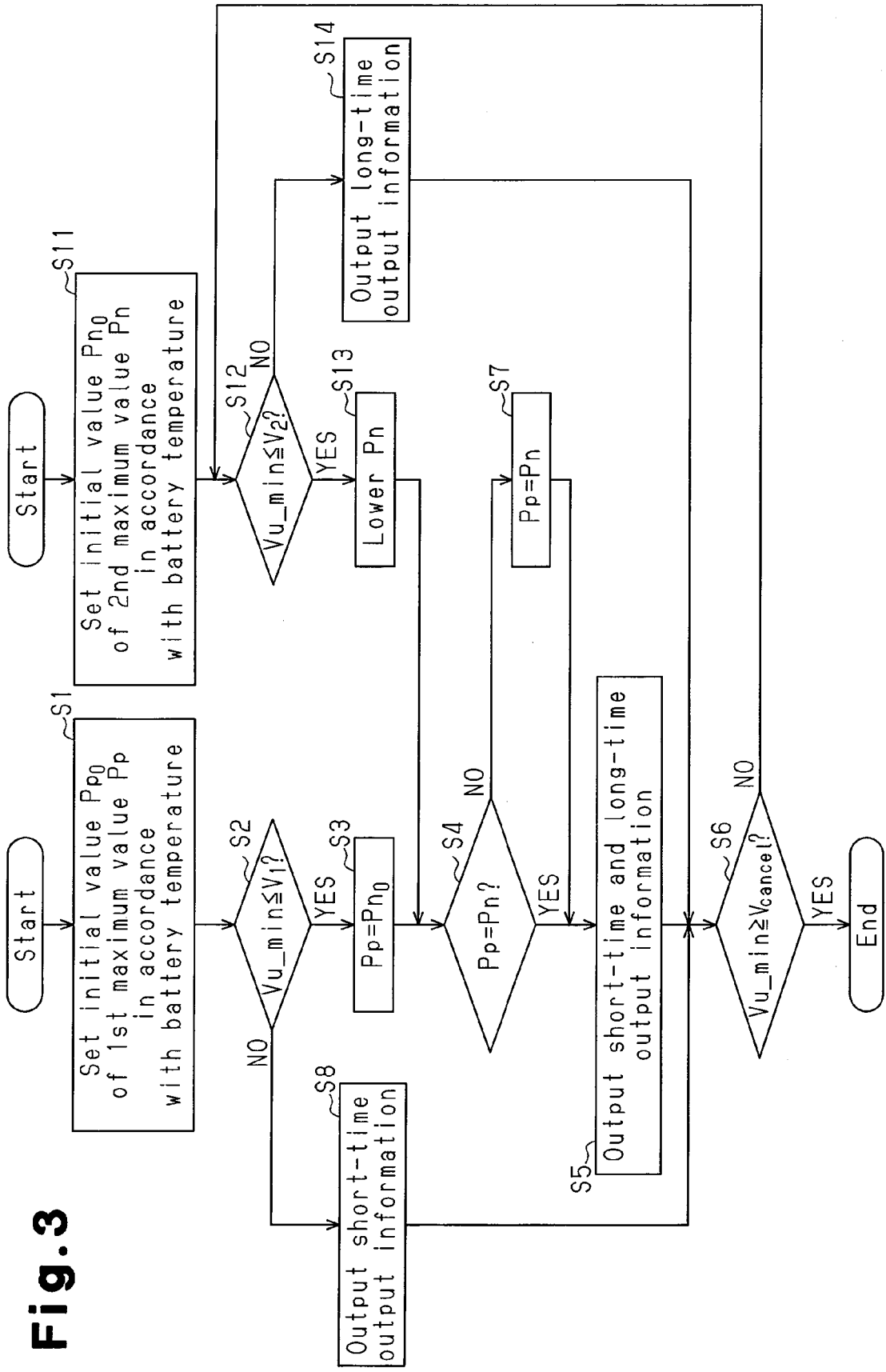
FIG. 3 is a flowchart showing an output control method for a rechargeable battery that is used by the controller of FIG. 2.
Figure 4:
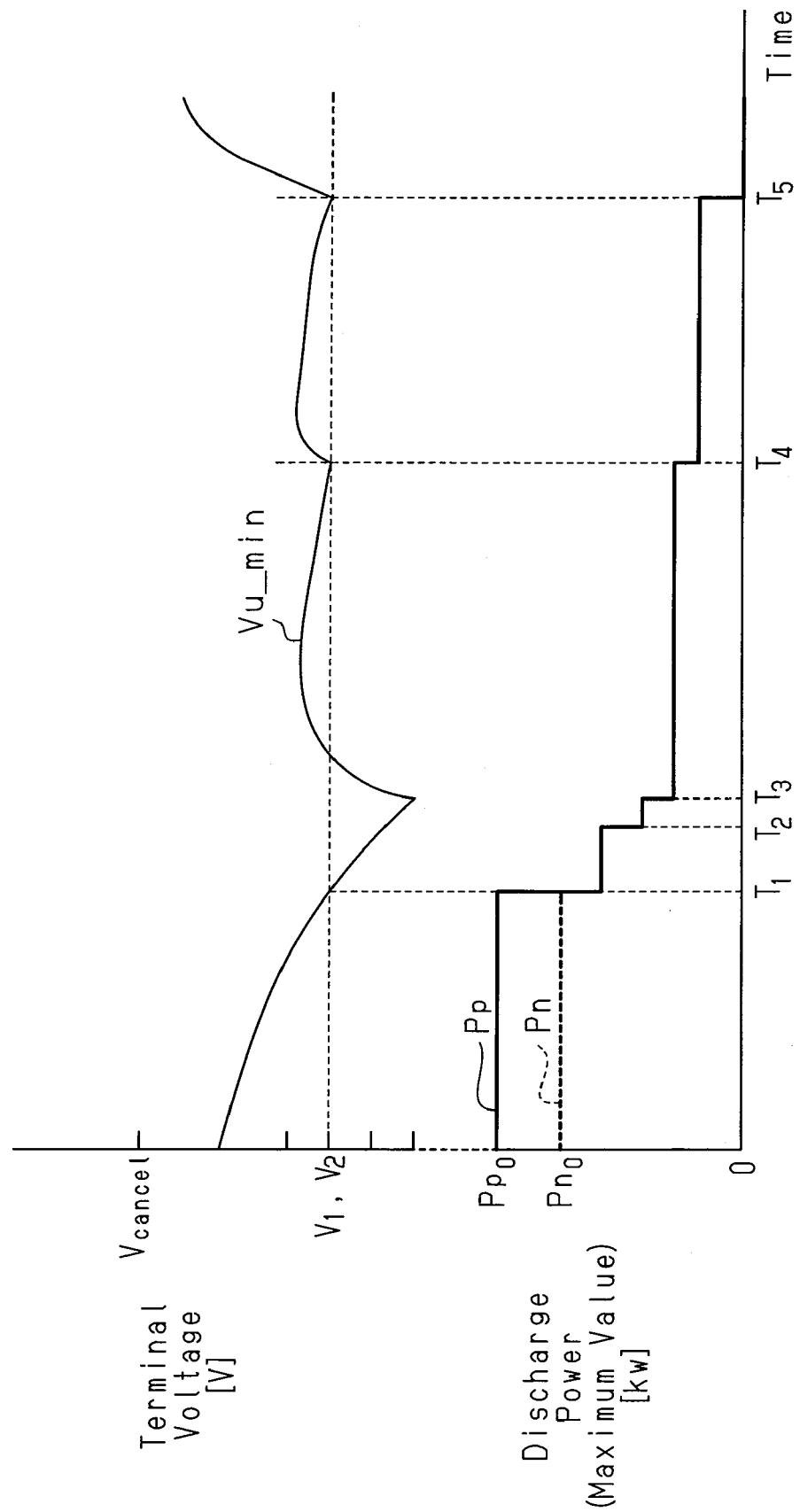
FIG. 4 is a timing chart showing changes in the terminal voltage of battery blocks included in the rechargeable battery shown in FIG. 2, the short-time output maximum value, and the long-time output maximum value as time elapses.

FIG. 3 is a flowchart showing the output control method in the first embodiment of the present invention. FIG. 4 is a timing chart showing changes in the terminal voltage of each battery block included in the rechargeable battery 10 shown in FIG. 2, the first maximum value Pp, and the second maximum value Pn. FIG. 5 is a graph showing the relationship between the temperature and the first maximum value Pp and the second maximum value Pn shown in FIG. 4.

First, as shown in FIG. 3, the control unit 2 determines the minimum battery temperature of the rechargeable battery 10 based on the temperature data provided from the temperature measurement unit 5 to set the initial value $Pp_0$ of the first maximum value Pp according to the determined minimum battery temperature (step S1). In this state, the control unit 2 operates in the normal processing mode. In the first embodiment, the storage unit 4 stores the initial value $Pp_0$ of the first maximum value Pp. Thus, the control unit 2 extracts the first maximum value Pp and the initial value $Pp_0$ from the storage unit 4.

The power chargeable into the rechargeable battery 10 changes according to the battery temperature. As a result, the first maximum value Pp also changes according to the battery temperature as shown in FIG. 5. The storage unit 4 stores the map (reference map Pp) for specifying the initial value $Pp_0$ of the first maximum value Pp corresponding to the battery temperature. Thus, the control unit 2 accesses the storage unit 4, refers to the reference map Pp, and extracts the initial value $Pp_0$ of the first maximum value Pp corresponding to the minimum battery temperature in step S1.

Figure 5:
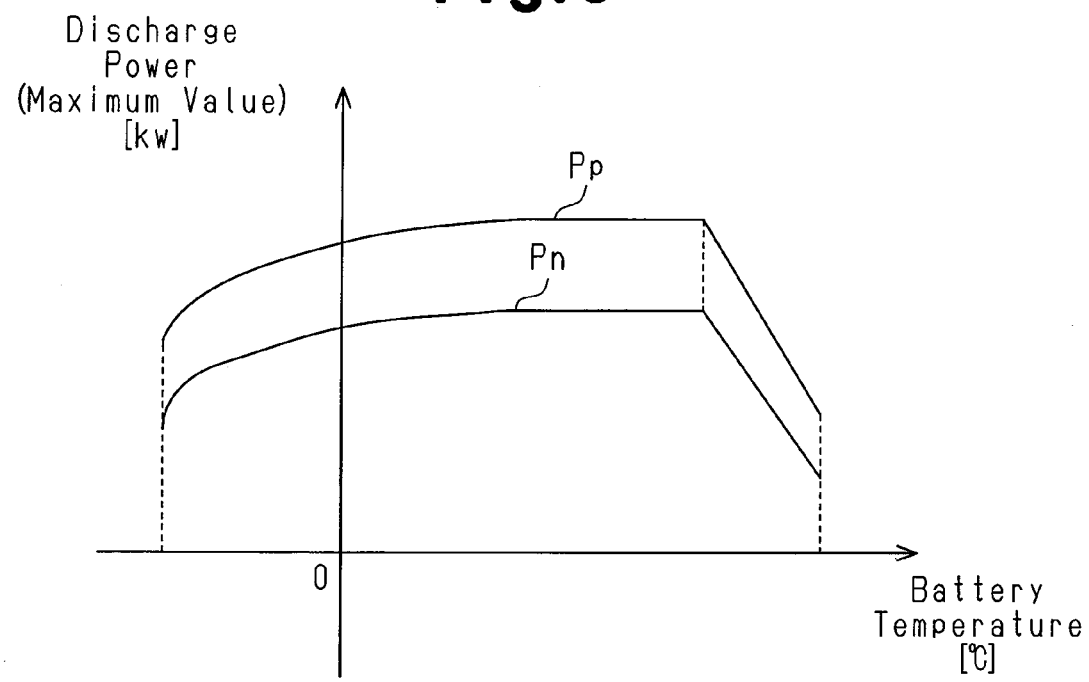
FIG. 5 is a graph showing the relationship between the temperature and the short-time output maximum value and the long-time output maximum value shown in FIG. 4.

As shown in FIG. 5, the initial value $Pn_0$ of the second maximum value Pn also changes according to the battery temperature. Thus, the storage unit 4 stores the map (reference map Pn) for specifying the initial value $Pn_0$ of the second maximum value Pn corresponding to the battery temperature in addition to the reference map Pp.

The control unit 2 sets the initial value $Pp_0$ of the first maximum value Pp at a value greater than the initial value $Pn_0$ of the second maximum value Pn when the battery temperature is the same. As a result, the vehicle ECU 20 can drive the motor even when the vehicle starts to move or when gears are changed in the same manner as in the prior art example shown in FIG. 1.

Next, the control unit 2 determines whether the minimum terminal voltage Vu_min is less than or equal to the reference voltage $V_1$ based on the voltage data provided from the voltage measurement unit 3 (step S2). When the minimum terminal voltage Vu_min is greater than the reference voltage $V_1$, the first maximum value Pp does not need to be lowered. Thus, the control unit 2 provides the vehicle ECU 20 with the first maximum value Pp (initial value $Pp_0$) set in step S1 as short-time output information (step S8). Subsequently, the control unit 2 performs the process of step S6.

When the minimum terminal voltage Vu_min is less than or equal to the reference voltage $V_1$, the first maximum value Pp must be lowered. Thus, the control unit 2 shifts to the limitation processing mode and lowers the first maximum value Pp. More specifically, at timing $T_1$ in FIG. 4, the control unit 2 lowers the first maximum value Pp and resets the first maximum value Pp to the same value as the initial value $Pn_0$ of the second maximum value Pn according to the battery temperature (step S3). Further, the control unit 2 rewrites the short-time output information accordingly.

The control unit 2 also performs the process of steps S11 to S13 and S14 in parallel with the process of steps S1 to S3 and S8. The process of steps S11 to S14 may be performed before the process of step S1 or after the process of step S3. The process of steps S11 to S14 will now be described.

The control unit 2 sets the initial value $Pn_0$ of the second maximum value Pn according to the minimum battery temperature (step S11). In this state, the control unit 2 operates in the normal processing mode. More specifically, the control unit 2 accesses the storage unit 4, refers to the reference map Pn, and extracts the initial value $Pn_0$ of the second maximum value Pn according to the minimum battery temperature.

Next, the control unit 2 determines whether the minimum terminal voltage Vu_min is less than or equal to the reference voltage $V_2$ based on the voltage data provided from the voltage measurement unit 3 (step S12). When the minimum terminal voltage Vu_min is greater than the reference voltage $V_2$, the second maximum value Pn does not need to be lowered. Thus, the control unit 2 provides the vehicle ECU 20 with the second maximum value Pn set in step S11 as long-time output information (step S14). Afterwards, the control unit 2 performs the process of step S6.

When the minimum terminal voltage Vu_min is less than or equal to the reference voltage $V_2$, the second maximum value Pn needs to be lowered. Thus, at timing $T_1$ in FIG. 4, the control unit 2 shifts to the limitation processing mode and lowers the second maximum value Pn (step S13).

In the first embodiment, the value by which the second maximum value Pn is lowered for the first time is preferably set according to the performance or the voltage falling speed of the rechargeable battery 10. Further, the values by which the second maximum value Pn is lowered from the second time and onward are also preferably set according to the performance or the voltage falling speed of the rechargeable battery 10.

When completing the process of steps S1 to S3 and the process of steps S11 to S13, the control unit 2 determines whether the present first maximum value Pp and the present second maximum value Pn are the same (step S4).

When the present first maximum value Pp and the present second maximum value Pn are the same, the control unit 2 provides the vehicle ECU 20 with the present first and second maximum values Pp and Pn (step S5).

When the present first maximum value Pp and the present second maximum value Pn are not the same, the control unit 2 resets the first maximum value Pp to the same value as the second maximum value Pn (step S7). For example, at timing $T_1$ in FIG. 3, the first maximum value Pp is first lowered to the initial value $Pn_0$ of the second maximum value Pn in step S3 and then lowered to the present second maximum value Pn, which is smaller than the initial value $Pn_0$ in step S7. Afterwards, the control unit 2 provides the vehicle ECU 20 with the reset first maximum value Pp and the present second maximum value Pn (step S5).

After step S5 is completed, the control unit 2 determines whether the present minimum terminal voltage Vu_min is greater than or equal to the cancellation voltage $V_{cancel}$ based on the latest voltage data provided from the voltage measurement unit 3 (step S6). When the present minimum terminal voltage Vu_min is greater than or equal to the cancellation voltage $V_{cancel}$, the control unit 2 terminates the process.

When the present minimum terminal voltage Vu_min is less than the cancellation voltage $V_{cancel}$, the control unit 2 must continue limiting the output from the rechargeable battery 10. Thus, the control unit 2 performs processing from step S12 again. More specifically, the terminal voltage of the rechargeable battery 10 may increase and become higher than the reference voltage $V_2$ after the first maximum value Pp or the second maximum value Pn is lowered. Thus, the control unit 2 returns to step S12 and compares the minimum terminal voltage Vu_min with the reference voltage $V_2$ again.

However, when the lowering of the first or second maximum value is insufficient, the minimum terminal voltage Vu_min may not be greater than the reference voltage $V_2$, or the minimum terminal voltage Vu_min may decrease immediately after the value becomes greater than the reference voltage $V_2$. Thus, in the first embodiment, at timings $T_2$, $T_3$, $T_4$, and $T_5$ shown in FIG. 4, for example, the second maximum value Pn is further lowered in a graded manner, and the first maximum value Pp is also lowered so as to follow the second maximum value Pn.

As described above in the first embodiment, the first maximum value Pp and the second maximum value Pn are lowered until the terminal voltage of the rechargeable battery 10 is lowered to the cancellation voltage $V_{cancel}$. The control unit 2 performs the process shown in FIG. 3 in predetermined cycles (e.g., cycles of 100 ms).

As described above, in the first embodiment, the first maximum value Pp and the second maximum value Pn are simultaneously lowered (FIG. 4) when the terminal voltage of the rechargeable battery 10 (battery block) is lowered to the reference voltage $V_1$ ($V_2$). This prevents the difference between the first maximum value Pp and the second maximum value from increasing. As a result, in the first embodiment, the drivablity is not lowered even if the output request for the rechargeable battery 10 from the vehicle ECU 20 to the controller 1 changes. Accordingly, the drivability is improved in comparison with the prior art.

In the first embodiment, the control unit 2 does not have to perform the process shown in FIG. 3 in predetermined cycles (e.g., cycles of 100 ms). For example, the control unit 2 may perform the process shown in FIG. 3 only when the terminal voltage of the rechargeable battery 10 (battery blocks) decreases to a reference voltage.

Further, in the first embodiment, the controller 1 may be realized by installing a program enabling the process shown in FIG. 2 in a microcomputer functioning as the battery ECU. In this case, a CPU (central processing unit) of the microcomputer functions as the control unit 2. Further, a circuit connected to the rechargeable battery 10 (e.g., an A/D conversion circuit) and the CPU may function as the voltage measurement unit 3, and a circuit connected to the temperature sensors 6 (e.g., an A/D conversion circuit) and the CPU may function as the temperature measurement unit 5. Further, the microcomputer may have a memory functioning as the storage unit 4.

When the electric vehicle is an HEV, the vehicle ECU may also function as the battery ECU. In this case, the vehicle ECU may function as the battery ECU (or the controller 1) by installing a program enabling the process shown in FIG. 3 in a microcomputer that functions as the vehicle ECU.

A controller 30 and an output control method for a rechargeable battery 10 according to a second embodiment of the present invention will now be described with reference to FIGS. 6 to 8. The structure of the controller 30 will first be described with reference to FIG. 6.

Figure 6:
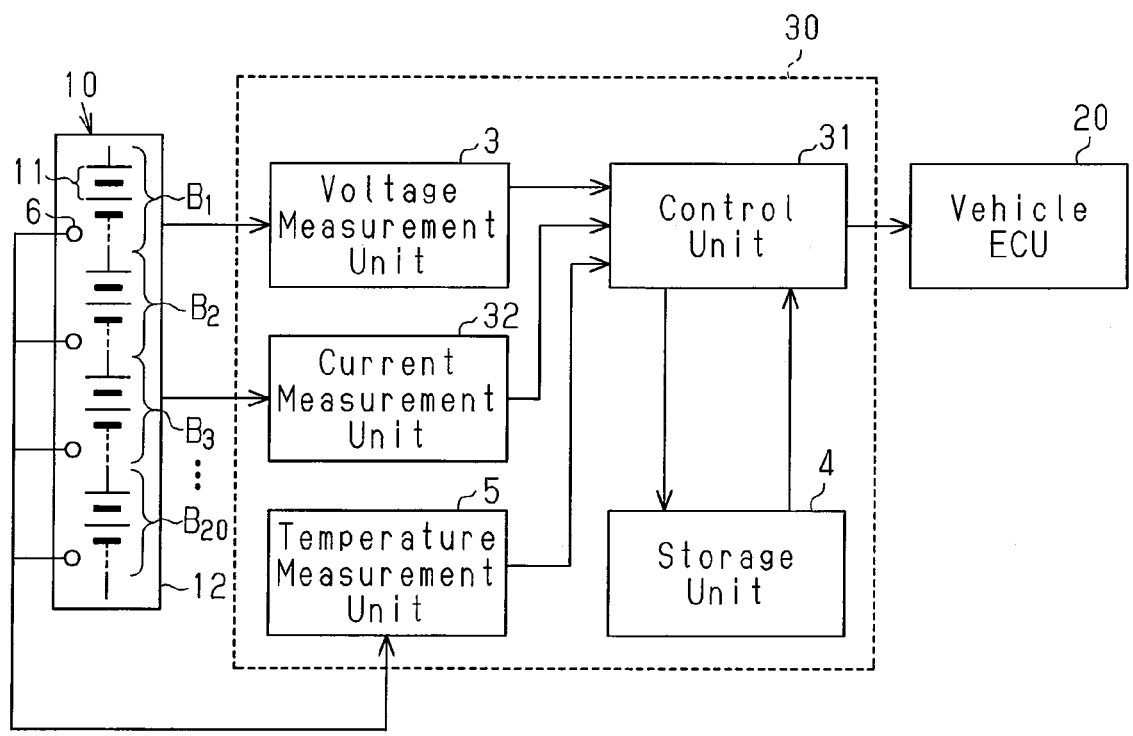
FIG. 6 is a schematic block diagram of a controller for a rechargeable battery according to a second embodiment of the present invention.

As shown in FIG. 6, the controller 30 of the second embodiment controls the rechargeable battery 10 that is installed in an HEV for driving a motor in the same manner as in the first embodiment. More specifically, a control unit 31 of the controller 30 sets a short-time output maximum value (first maximum value) Pp and a long-time output maximum value (second maximum value) Pn and provides short-time output information and long-time output information to a vehicle ECU 20 in the same manner as the control unit 2 shown in FIG. 1.

The controller 30 of the second embodiment differs from the controller 1 of the first embodiment in the process for lowering the first maximum value Pp, the process for setting an initial value $Pp_0$ of the first maximum value Pp, and the process for setting an initial value $Pn_0$ of the second maximum value Pn.

More specifically, the control unit 31 lowers the first maximum value Pp to the initial value $Pp_0$ of the second maximum value Pn in a graded manner in the second embodiment. Further, the control unit 31 estimates the state of charge (SOC) of the rechargeable battery 10 and sets the initial value $Pp_0$ of the first maximum value Pp and the initial value $Pn_0$ of the second maximum value Pn according to the estimated SOC.

To calculate the SOC with the control unit 31, the controller 30 includes a current measurement unit 32. The current measurement unit 32 measures a current value I of the current of the rechargeable battery 10 when the rechargeable battery 10 is charged or discharged based on a signal provided from a current sensor (not shown). In the second embodiment, the current measurement unit 32 converts an analog signal provided from the current sensor to a digital signal. Based on the digital signal, the current measurement unit 32 generates current data specifying the current value I of the current that is input into the rechargeable battery 10 when the rechargeable battery 10 is charged and current data specifying the current value I of the current that is output from the rechargeable battery 10 when the rechargeable battery 10 is discharged. The current measurement unit 32 provides the generated current data to the control unit 31.

The current measurement unit 32 generates current data indicating a negative value when the rechargeable battery 10 is charged and current data indicating a positive value when the rechargeable battery 10 is discharged. The current measurement unit 32 provides the current data to the control unit 31 in preset cycles. The control unit 31 stores the received current data in the storage unit 4.

In the second embodiment, the control unit 31 estimates a first SOC based on an accumulated capacity Q of the rechargeable battery 10. Further, the control unit 31 estimates a second SOC based on the history of charging and discharging operations of the rechargeable battery 10. The control unit 31 calculates the difference between the first SOC and the second SOC to correct the first SOC based on the calculated difference. The corrected first SOC is specified as the SOC of the rechargeable battery 10. The control unit 31 may estimate only either one of the first SOC and the second SOC.

More specifically, the first SOC is estimated through the next procedures. First, the control unit 31 reads current data stored in the storage unit 4 and obtains the current value I. When the obtained current value I is a value indicating a charging current (−), the control unit 31 multiplies the current value I by the charging efficiency. Next, the control unit 31 accumulates the obtained current value I (product in the case of charging) for a predetermined period of time to calculate the accumulated capacity Q. The control unit 31 further calculates the difference between the accumulated capacity Q and the capacity of the rechargeable battery 10 in a fully charged state, which is calculated in advance based on experiments. The control unit 31 then calculates the ratio of the accumulated capacity Q to the capacity of the rechargeable battery 10 in the fully charged state. The control unit 31 specifies the calculated ratio (%) as the first SOC.

The second SOC is estimated through the next procedures. First, the control unit 31 obtains a set of voltage and current data for each battery block. The voltage and current data respectively show the value of the terminal voltage and the current value I of current charging and discharging the battery block within a predetermined period of time. More specifically, the control unit 31 obtains the voltage value of the terminal voltage based on the voltage data provided from the voltage measurement unit 3 and obtains the current value I during charging or discharging based on current data provided from the current measurement unit 32. The control unit 31 stores the obtained set of voltage and current data in the storage unit 4 as the history of charging and discharging operations.

Next, the control unit 31 selects one of the sets of voltage and current data stored in the storage unit 4 as a representative set of voltage and current data. The representative set of voltage and current data has an average level of the sets of voltage and current data for the battery blocks. The control unit 31 calculates a linear regression line (V-I linear regression line) from the selected representative set of data using a regression analysis method. The control unit 31 further obtains the V intercept of the V-I linear regression line, and sets the V intercept as a representative non-load voltage OCV, which is a representative one of non-load voltages of all the battery blocks.

Next, the control unit 31 estimates a polarization voltage of the rechargeable battery 10 based on a change amount $\Delta Q$ per unit time of the accumulated capacity Q. More specifically, the control unit 31 performs a time delay process and an averaging process on the change amount $\Delta Q$ so that a change element corresponding to an unnecessary high-frequency element is removed from the change amount $\Delta Q$ to yield a change amount $\Delta Q'$. Further, the control unit 31 specifies the highest temperature (highest battery temperature) in all of the groups. Next, the control unit 31 specifies a polarization voltage corresponding to the highest battery temperature and the change amount $\Delta Q'$ using a two-dimensional map having the temperature on its vertical axis (or horizontal axis) and the change amount $\Delta Q'$ on its horizontal axis (or vertical axis) and showing polarization voltages on intersections of the vertical axis and the horizontal axis. The control unit 31 estimates the polarization voltage of the rechargeable battery 10 using this two-dimensional map. This two-dimensional map is also stored in the storage unit 4.

Next, the control unit 31 subtracts the estimated polarization voltage from the non-load voltage OCV (the representative value of all the battery blocks) to calculate the electromotive force of the battery blocks. The electromotive force is calculated as a representative value of all the battery blocks. Further, the control unit 31 specifies the SOC corresponding to the calculated electromotive force and the average battery temperature using a two-dimensional map having the temperature on its vertical axis (or horizontal axis) and the electromotive force on its horizontal axis (or vertical axis) and showing values of the SOC at intersections of the vertical axis and the horizontal axis. The control unit 31 sets the specified SOC as the second SOC. This two-dimensional map is also stored in the storage unit 4.

In the second embodiment, the non-load voltage OCV is not limited to the representative value of all the battery blocks as described above. For example, the electromotive force of the entire rechargeable battery may be calculated from the non-load voltage of the entire rechargeable battery and the second SOC may be estimated based on the calculated electromotive force.

In the second embodiment, the storage unit 4 further stores a reference map Pp for specifying the initial value $Pp_0$ of the first maximum value Pp corresponding to the SOC and a reference map Pn for specifying the initial value $Pn_0$ of the second maximum value Pn corresponding to the SOC. The two reference maps are preferably set in a manner that the initial value $Pp_0$ of the first maximum value Pp is greater than the initial value $Pn_0$ of the second maximum value Pn when the SOC is the same.

The components of the controller 30 in the second embodiment shown in FIG. 6 that are like to those of the controller 1 of the first embodiment shown in FIG. 1 are denoted with the same reference numerals.

The output control method for the rechargeable battery 10 in the second embodiment will now be described with reference to FIGS. 7 and 8. The output control method of the second embodiment is executed by operating the controller 30 shown in FIG. 6. Thus, with reference to FIG. 6, the output control method will be described hereafter based on the operation of the controller 30.

Figure 7:
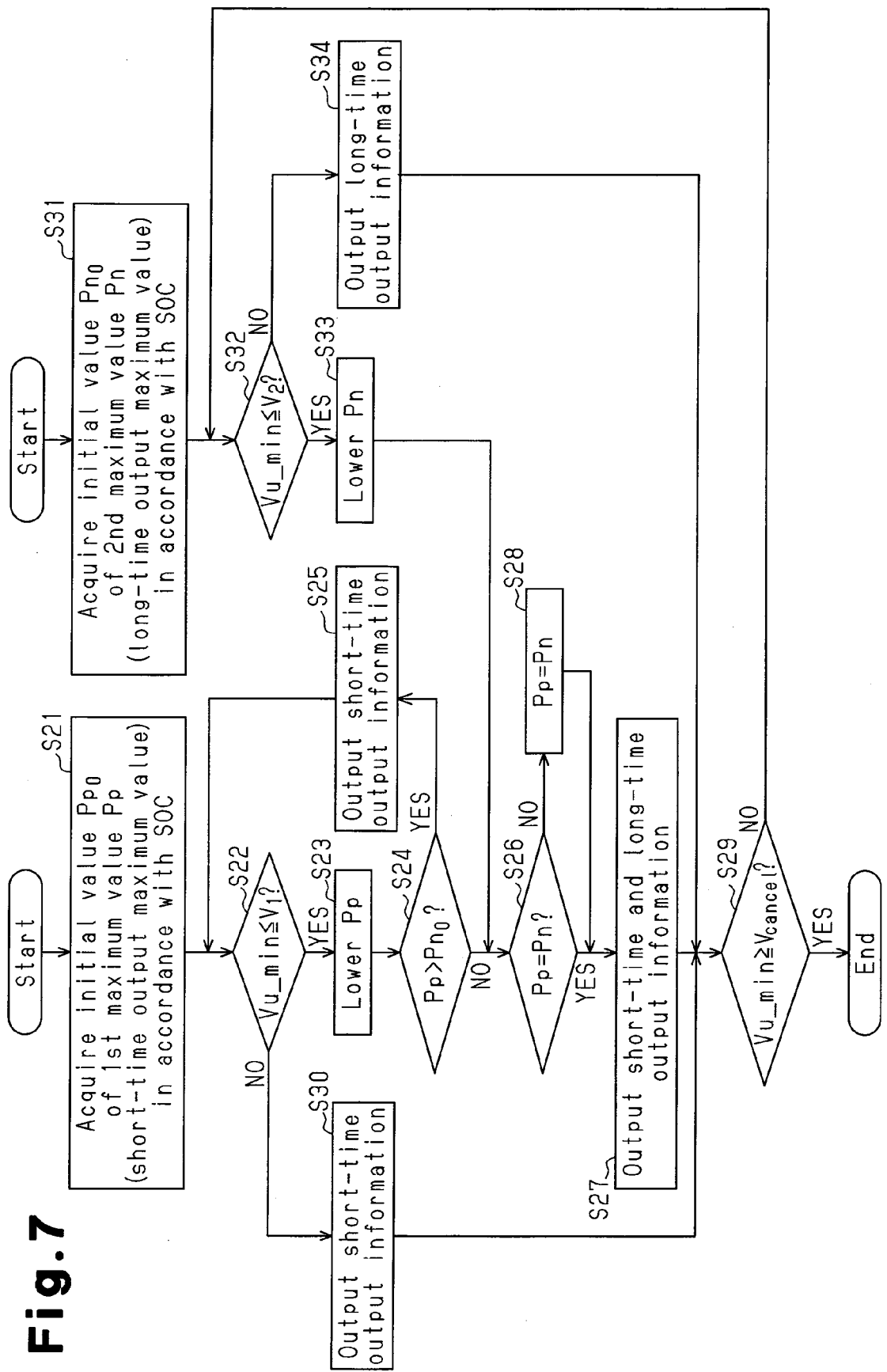
FIG. 7 is a flowchart showing an output control method for a rechargeable battery that is used by the controller of FIG. 6.
Figure 8:
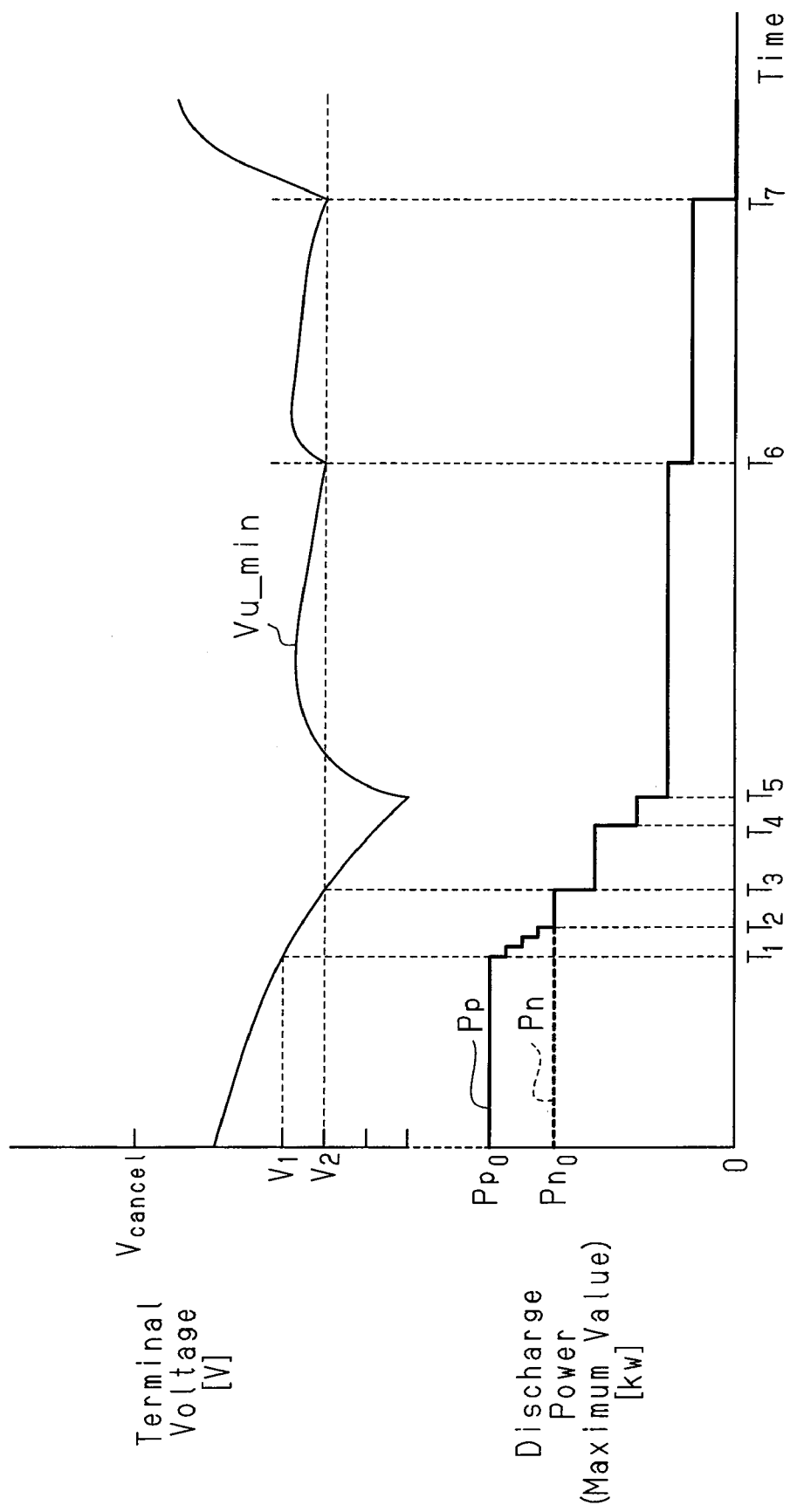
FIG. 8 is a timing chart showing the terminal voltage of battery blocks included in the rechargeable battery shown in FIG. 6, the short-time output maximum value, and the long-time output maximum value.

FIG. 7 is a flowchart showing the output control method according to the second embodiment of the present invention. FIG. 8 is a timing chart showing changes in the terminal voltage of each battery block included in the rechargeable battery 10 shown in FIG. 6, the first maximum value Pp, and the second maximum value Pn.

As shown in FIG. 7, the control unit 31 first calculates the SOC of the rechargeable battery 10 and sets the initial value $Pp_0$ of the first maximum value Pp according to the calculated SOC using the reference map Pp stored in the storage unit 4 (step S21). In this state, the control unit 31 operates in the normal processing mode. More specifically, the control unit 31 operates in the normal processing mode in a period between timing 0 (start) and timing $T_1$ shown in FIG. 8.

Next, the control unit 31 determines whether the minimum terminal voltage Vu_min is less than or equal to the reference voltage $V_1$ based on the voltage data provided from the voltage measurement unit 3 (step S22). When the minimum terminal voltage Vu_min is greater than the reference voltage $V_1$, the first maximum value Pp does not need to be lowered. Thus, the control unit 31 provides the vehicle ECU 20 with the first maximum value Pp set in step S21 as short-time output information (step S30). Afterwards, the control unit 31 performs the process of step S29.

When the minimum terminal voltage Vu_min is less than or equal to the reference voltage $V_1$, the first maximum value Pp needs to be lowered. Thus, the control unit 31 lowers the first maximum value Pp in the same manner as in the period between timing $T_1$ and timing $T_2$ (step S23). In step S23, the control unit 31 preferably lowers the first maximum value Pp by a value within a predetermined range (e.g., 2 kw).

Next, the control unit 31 determines whether the first maximum value Pp that has been lowered is greater than the initial value $Pn_0$ of the second maximum value Pn (step S24) The initial value $Pn_0$ of the second maximum value Pn is set in step S31.

When the first maximum value Pp is greater than the initial value $Pn_0$ of the second maximum value Pn, the control unit 31 provides the vehicle ECU 20 with short-time output information indicating the first maximum value Pp (step S25). Afterwards, the control unit 31 again performs the process of step S22. More specifically, the terminal voltage of the rechargeable battery 10 may be greater than the reference voltage $V_1$ after the first maximum value Pp is lowered. Thus, the control unit 31 returns to step S22 and again determines whether the minimum terminal voltage Vu_min is greater than or equal to the reference voltage $V_1$. The processes of steps S22 to S25 are repeated until the first maximum value Pp becomes less than or equal to the initial value $Pn_0$ of the second maximum value Pn. Accordingly, in the second embodiment, the first maximum value Pp is lowered in a graded manner in the period between timing $T_1$ and timing $T_2$ shown in FIG. 8.

When the first maximum value Pp is smaller than or equal to the initial value $Pn_0$ of the second maximum value Pn in step S24, the control unit 31 performs the process of step S26. The control unit 31 also performs the process of steps S31 to S34 in parallel with the process of steps S21 to S30. The process of steps S31 to S34 may be performed before the process of step S21 or after the process of step S24. The process of steps S31 to S34 will now be described.

The control unit 31 calculates the SOC of the rechargeable battery 10 and sets the initial value $Pn_0$ of the second maximum value Pn according to the calculated SOC by referring to the reference map Pn stored in the storage unit 4 (step S31). In this state, the control unit 31 operates in the normal processing mode. More specifically, the control unit 31 operates in the normal processing mode in the period between timing 0 (start) and timing $T_3$ shown in FIG. 7.

Next, the control unit 31 determines whether the minimum terminal voltage Vu_min is less than or equal to the reference voltage $V_2$ based on the voltage data provided from the voltage measurement unit 3 (step S32). As described above, the reference voltage $V_2$ is less than the reference voltage $V_1$ in the second embodiment.

When the minimum terminal voltage Vu_min is greater than the reference voltage $V_2$, the second maximum value Pn does not need to be lowered. Thus, the control unit 31 provides the vehicle ECU 20 with the second maximum value Pn set in step S31 (step S34). Afterwards, the control unit 31 performs the process of step S29.

When the minimum terminal voltage Vu_min is less than or equal to the reference voltage $V_2$, the second maximum value Pn needs to be lowered. Thus, at timing $T_3$ in FIG. 7, the control unit 31 lowers the second maximum value Pn (step S33). The process of step S33 is performed in the same manner as the process of step S13 shown in FIG. 2 in the first embodiment.

When completing the process of steps S21 to S25 and the process of steps S31 to S33, the control unit 31 determines whether the present first maximum value Pp and the present second maximum value Pn are the same (step S26). When the present first maximum value Pp and the present second maximum value Pn are the same, the control unit 31 provides the vehicle ECU 20 with the present first and second maximum values Pp and Pn (step S27).

When the present first maximum value Pp and the present second maximum value Pn are not the same in step S26, the control unit 31 sets the first maximum value Pp to the same value as the second maximum value Pn (step S28). Afterwards, the control unit 31 performs the process of step S27.

After step S27, the control unit 31 determines whether the present minimum terminal voltage Vu_min is greater than or equal to the cancellation voltage $V_{cancel}$ based on the latest voltage data provided from the voltage measurement unit 3 (step S29). When the present minimum terminal voltage Vu_min is greater than or equal to the cancellation voltage $V_{cancel}$, the control unit 31 terminates the process.

When the present minimum terminal voltage Vu_min is less than the cancellation voltage $V_{cancel}$ in step S29, the control unit 31 must continue limiting the output of the rechargeable battery 10. Thus, the control unit 31 performs processing from step S32 again. More specifically, the terminal voltage of the rechargeable battery 10 may increase and be greater than the reference voltage $V_2$ after the first maximum value Pp or the second maximum value Pn is lowered. Thus, the control unit 31 returns to step S32 and again compares the minimum terminal voltage Vu_min with the reference voltage $V_2$. This lowers the second maximum value Pn in a graded manner as indicated at timings $T_2$, $T_3$, $T_4$, $T_5$, $T_6$, and $T_7$ shown in FIG. 8 and also lowers the first maximum value Pp in a manner following the second maximum value Pn.

As described above in the second embodiment, the first maximum value Pp and the second maximum value Pn are lowered until the terminal voltage of the rechargeable battery 10 is lowered to the cancellation voltage $V_{cancel}$. The control unit 31 performs the process shown in FIG. 7 in constant cycles (e.g., cycles of 100 ms).

As described above, in the second embodiment, the first maximum value Pp is first lowered when the terminal voltage of the rechargeable battery 10 (battery block) is lowered. Then, the second maximum value Pn is lowered when the terminal voltage decreases to the reference voltage $V_2$ (refer to FIG. 8. Thus, in the same manner as in the first embodiment, the difference between the first maximum value Pp and the second maximum value is prevented from increasing. As a result, in the first embodiment, the drivability is improved in comparison with the prior art. Further, in the second embodiment, the first maximum value Pp is lowered in a graded manner. This further increases the drivability.

In the second embodiment, the repetitive processing of steps S22 to S25 is preferably terminated under a predetermined condition. More specifically, the minimum terminal voltage Vu_min may suddenly decrease to the reference voltage $V_2$ or to a value between the reference voltage $V_1$ and the reference voltage $V_2$. In this case, the control unit 31 stops the repetitive processing of steps S22 to S25. More specifically, the control unit 31 may stop lowering the first maximum value Pp in a graded manner and forcibly perform step S26.

Under this control, the first maximum value Pp is immediately lowered to the second maximum value Pn when the minimum terminal voltage Vu_min rapidly decreases to a value close to the reference voltage $V_2$. Thus, the difference between the first maximum value Pp and the second maximum value is prevented from being increased.

In the second embodiment, the control unit 31 does not have to perform the process shown in FIG. 7 in predetermined cycles. For example, the control unit 31 may perform the process shown in FIG. 6 only when the terminal voltage of the rechargeable battery 10 (battery blocks) decreases to a predetermined reference voltage.

Further, in the second embodiment, the controller 30 may be realized by installing a program enabling the process shown in FIG. 7 in a microcomputer functioning as the battery ECU. In this case, a CPU of the microcomputer functions as the control unit 31. Further, a circuit connected to the rechargeable battery 10 (e.g., an A/D conversion circuit) and the CPU may function as the voltage measurement unit 3, a circuit connected to the current sensor (e.g., an A/D conversion circuit) and the CPU may function as the current measurement unit 32, and a circuit connected to the temperature sensors 6 and the CPU may function as the temperature measurement unit 5. Additionally, the microcomputer may have a memory functioning as the storage unit 4.

Further, in the second embodiment, the vehicle ECU 20 may function as the battery ECU. In this case, the vehicle ECU 20 may function as the battery ECU (that is, a controller 20) by installing a program enabling execution of the program shown in FIG. 7 in a microcomputer that functions as the vehicle ECU 20.

A controller 44 and an output control method for a rechargeable battery 10 according to a third embodiment of the present invention will now be described with reference to FIGS. 9 to 11. The structure of the controller 44 of the third embodiment will first be described with reference to FIG. 9.

Figure 9:
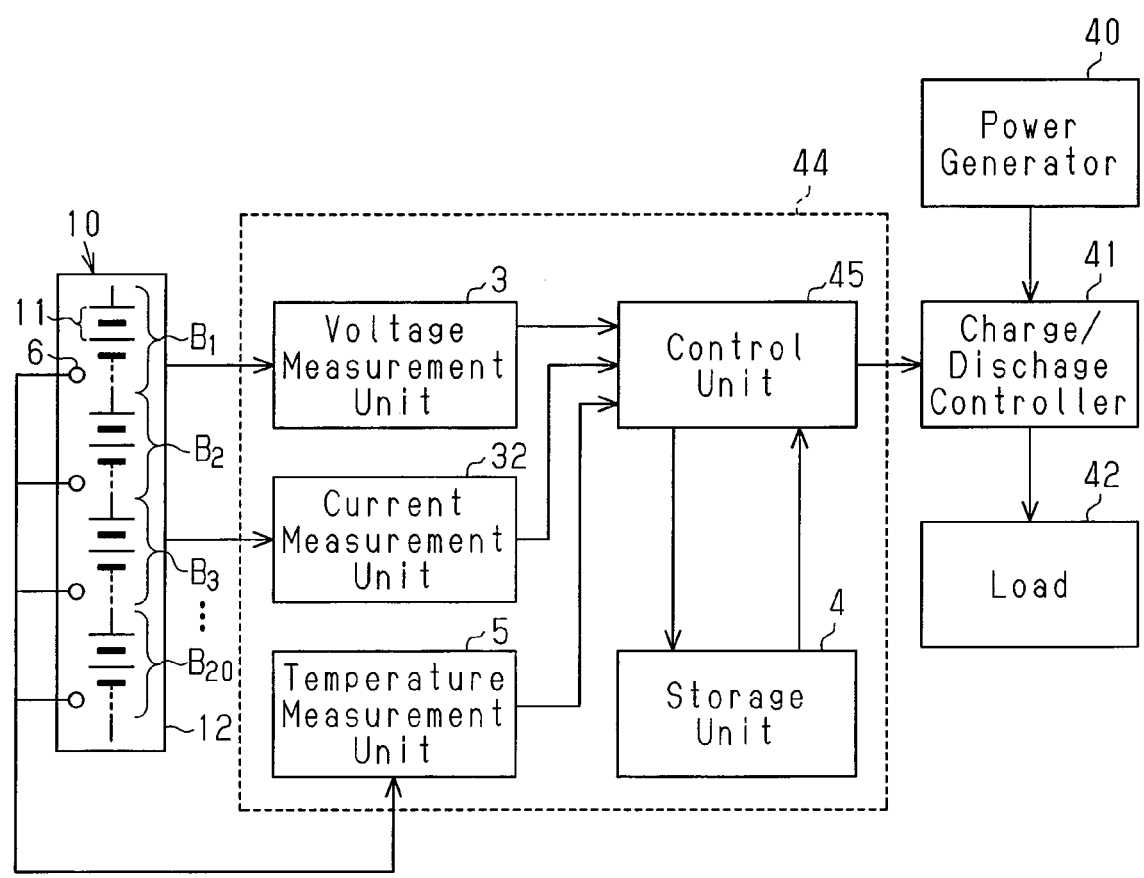
FIG. 9 is a schematic block diagram of a controller for a rechargeable battery according to a third embodiment of the present invention.

As shown in FIG. 9, the controller 44 of the third embodiment is applied to a power supply system including the rechargeable battery 10 and a power generator 40. The rechargeable battery 10 has the same structure as the structure of the rechargeable battery 10 of the first and second embodiments. Specific examples of the power generator 40 include a motor, a solar power generation system (solar battery), a fuel battery, a wind power generation apparatus, a water power generation apparatus, and a thermal power generation apparatus including an internal combustion engine such as a gas turbine engine.

In the power supply system shown in FIG. 9, excessive power that is output from the power generator 40 but is not required by a load 42 is supplied to the rechargeable battery 10 via a charging controller 41. The rechargeable battery 10 is charged using the excessive power. When the consumption power of the load 42 increases rapidly and the load 42 requires power exceeding the output of the power generator 40, power for compensating the lack of power is supplied from the rechargeable battery 10 to the load 42 via the charging controller 41.

In the power supply system shown in FIG. 9, the rechargeable battery 10 is normally controlled in a manner that its SOC changes in a range of about 20 to 80% in the same manner as in an HEV (refer to "BACKGROUND OF THE INVENTION"). More specifically, the controller 44 of the third embodiment calculates the SOC of the rechargeable battery 10 with the same method as in the second embodiment and provides information indicating the calculated SOC to the charging controller 41. The charging controller 41 controls charging and discharging operations of the rechargeable battery 10 based on the information (SOC) in a manner that the SOC of the rechargeable battery 10 falls within a range of about 20 to 80%.

As shown in FIG. 9, the controller 44 of the third embodiment includes a voltage measurement unit 3, a temperature measurement unit 5, a current measurement unit 32, a storage unit 4, and a control unit 45. The voltage measurement unit 3, the temperature measurement unit 5, and the storage unit 4 have the same structures as those in the first embodiment. The current measurement unit 32 has the same structure as that in the second embodiment. The control unit 45 sets a plurality of output maximum values $P_1, P_2, \ldots, P_n$ each indicating the upper limit of the charge power that is supplied to the rechargeable battery 10 in a predetermined time uniquely set for each output maximum value.

The third embodiment differs from the first and second embodiments in that the control unit 45 sets three output maximum values, that is, an ultra short-time output maximum value Ps, a short-time output maximum value Pp, and a long-time output maximum value Pn. In the third embodiment, the ultra short-time output maximum value Ps is referred to as "first maximum value", the short-time output maximum value Pp as "second maximum value", and the long-time output maximum value Pn as "third maximum value". The control unit 45 stores the first maximum value Ps, the second maximum value Pp, and the third maximum value Pn in the storage unit 4 as ultra short-time output information, short-time output information, and long-time output information, respectively.

The control unit 45 provides the charging controller 41 with the ultra short-time output information, the short-time output information, and the long-time output information. The charging controller 41 receives the ultra short-time output information, the short-time output information, and the long-time output information from the control unit 45 and supplies power from the rechargeable battery 10 to the load 42 so as not to exceed the output maximum values specified by the received information.

The first maximum value Ps may specify the upper limit of the discharge power that is supplied to the rechargeable battery 10 in an extremely short time period, such as one second or less. More specifically, when the charging controller 41 requests the rechargeable battery 10 to output an instantaneous high discharge, the first maximum value Ps is used to limit the discharge power of the rechargeable battery 10.

The second maximum value Pp may specify the upper limit of the charge power that is supplied to the rechargeable battery 10 in a relatively short time period, such as about two seconds. For example, when the charging controller 41 requests the rechargeable battery 10 to output a high discharge during a relatively short period, the second maximum value Pp is used to limit the discharge power of the rechargeable battery 10. The third maximum value Pn may specify the upper limit of the charge power that is supplied to the rechargeable battery 10 in a relatively long time period of, for example, about ten seconds. For example, the third maximum value Pn limits the discharge power from the rechargeable battery 10 when the load 42 is functioning normally.

In the same manner as in the first and second embodiments, the control unit 45 functions in operation modes including a limitation processing mode and a normal processing mode. In the third embodiment, the control unit 45 lowers the first maximum value Ps in addition to the second maximum value Pp and the third maximum value Pn in the limitation processing mode.

More specifically, in the limitation processing mode, the control unit 45 resets the first maximum value Ps to lower the value when the minimum terminal voltage Vu_min decreases to the reference voltage $V_1$. Further, the control unit 45 resets the second maximum value Pp to lower the value when the minimum terminal voltage Vu_min decreases to the second reference voltage $V_2$. The control unit 45 resets the third maximum value Pn to lower the value when the minimum terminal voltage Vu_min decreases to the reference voltage $V_3$. After lowering the output maximum value, the control unit 45 rewrites output information corresponding to the output maximum value and provides the charging controller 41 with the rewritten output information.

In the normal processing mode, the control unit 45 also sets an initial value $Ps_0$ for the ultra short-time output maximum value (first maximum value) Ps in addition to initial values of the short-time output maximum value (second maximum value) Pp and the long-time output maximum value (third maximum value) Pn. The control unit 45 provides the charging controller 41 with the initial value $Ps_0$ as ultra short-time output information. The initial value $Ps_0$ of the first maximum value Ps is also stored in the storage unit 4.

The control unit 45 sets the first maximum value Ps according to the temperature data provided from the temperature measurement unit 5. This is because the first maximum value Ps also changes according to the battery temperature in the same manner as the second maximum value Pp and the third maximum value Pn (refer to FIG. 5). Thus, in the third embodiment, the storage unit 4 also stores a map (reference map Ps) for specifying the initial value $Ps_0$ of the first maximum value Ps corresponding to the battery temperature.

In the third embodiment, a reference voltage $V_1$, a reference voltage $V_2$, and a reference voltage $V_3$ are set at the same value. The control unit 45 cancels the limitation processing mode and returns to the normal processing mode when the minimum terminal voltage Vu_min of the battery blocks increases to a cancellation voltage $V_{cancel}$ that is greater than the reference voltages $V_1$, $V_2$, and $V_3$.

However, in the third embodiment, the reference voltage $V_1$, the reference voltage $V_2$, and the reference voltage $V_3$ does not have to be set at the same value. The reference voltage $V_1$ may be set greater than the reference voltage $V_2$, and the reference voltage $V_2$ may be set greater than the reference voltage $V_3$. In such a case, the difference between the first maximum value Ps and the second maximum value Pp and the difference between the second maximum value Pp and the third maximum value Pn are prevented from increasing.

In the third embodiment, the storage unit 4 further stores a map showing the relationships of temperatures and the corresponding optimum values of the reference voltages $V_1$, $V_2$, and $V_3$. The control unit 45 determines the minimum battery temperature based on the temperature data, applies the minimum battery temperature to the map, and sets the reference voltages $V_1$, $V_2$, and $V_3$. This map is generated to reflect the performance of the rechargeable battery 10 or the load of the rechargeable battery 10 based on the results of discharging experiments conducted in advance. The storage unit 4 further stores the value of the cancellation voltage $V_{cancel}$.

The output control method for the rechargeable battery 10 according to the third embodiment will now be described with reference to FIGS. 10 and 11. The output control method of the third embodiment is executed by operating the controller 44 shown in FIG. 9. Thus, the output control method will hereafter be described based on the operation of the controller 44 shown in FIG. 9.

Figure 10:
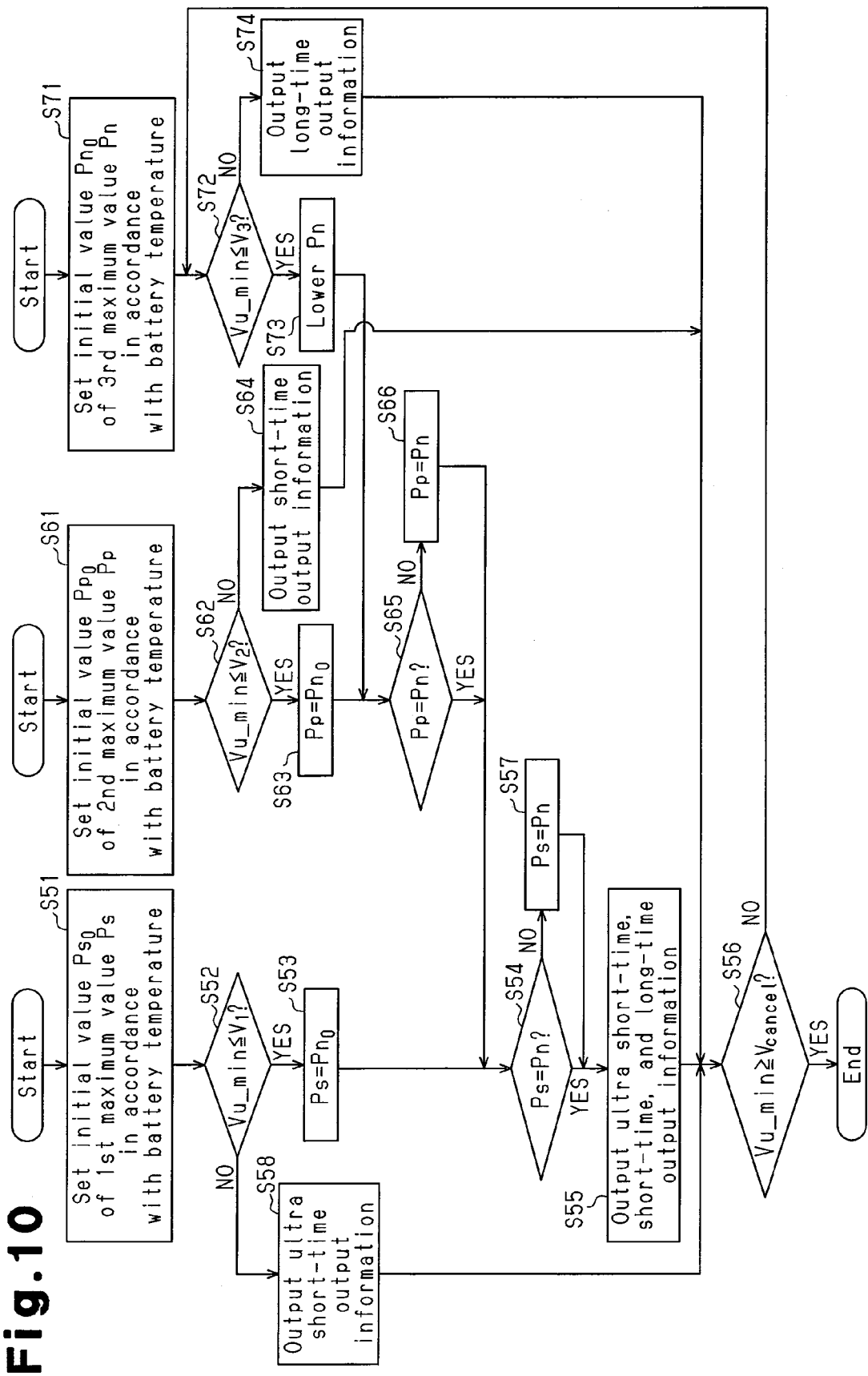
FIG. 10 is a flowchart showing an output control method for a rechargeable battery that is used by the controller of FIG. 9.

FIG. 10 is a flowchart showing the output control method according to the third embodiment of the present invention. FIG. 11 is a timing chart showing changes in the terminal voltage of each battery block included in the rechargeable battery 10 shown in FIG. 9, the first maximum value Ps, the second maximum value Pp, and the third maximum value Pn.

First, as shown in FIG. 10, the control unit 45 determines the minimum battery temperature of the rechargeable battery 10 based on the temperature data provided from the temperature measurement unit 5 and sets the initial value $Ps_0$ of the first maximum value Ps according to the minimum battery temperature (step S51). In this state, the control unit 45 operates in the normal processing mode. In the third embodiment, the initial value $Ps_0$ of the first maximum value Ps according to the minimum battery temperature is extracted by referring to the reference map Ps stored in the storage unit 4.

In the third embodiment, the initial value $Ps_0$ of the first maximum value Ps is set greater than the initial value $Pp_0$ of the second maximum value Pp when the battery temperature is the same. This is because the charging controller 41 stably supplies the load 42 with power in response to a request for instantaneous discharge of power.

Next, the control unit 45 determines whether the minimum terminal voltage Vu_min is less than or equal to the reference voltage $V_1$ based on the voltage data provided from the voltage measurement unit 3 (step S52). When the minimum terminal voltage Vu_min is greater than the reference voltage $V_1$, the first maximum value Ps does not need to be lowered. Thus, the control unit 45 provides the charging controller 41 with the first maximum value Ps set in step S51 as ultra short-time output information (step S58). Afterwards, the control unit 45 performs the process of step S56.

When the minimum terminal voltage Vu_min is less than or equal to the reference voltage $V_1$, the first maximum value Ps needs to be lowered. Thus, the control unit 45 shifts to the limitation processing mode and lowers the first maximum value Ps. More specifically, at timing $T_1$ in FIG. 11, the control unit 45 lowers the first maximum value Ps and resets the first maximum value Ps to the same value as the initial value $Pn_0$ of the third maximum value Pn according to the battery temperature (step S53). Further, the control unit 45 rewrites the ultra short-time output information accordingly.

The control unit 45 also performs the processes of steps S61 to S66 and the processes of steps S71 to S74 in parallel with the process of steps S51 to S53 and S58. The process of steps S61 to S66 and the process of steps S71 to S74 may be performed before the process of step S51 or after the process of step S53.

The process of steps S61 to S64 will now be described. The control unit 45 sets the initial value $Pp_0$ of the second maximum value Pp according to the average battery temperature (step S61). In step S61, the reference map Pp is used in the same manner as in step S1 shown in FIG. 2. Next, the control unit 45 determines whether the minimum terminal voltage Vu_min is less than or equal to the reference voltage $V_2$ based on the voltage data provided from the voltage measurement unit 3 (step S62).

When the minimum terminal voltage Vu_min is greater than the reference voltage $V_2$, the control unit 45 provides the charging controller 41 with the second maximum value Pp set in step S61 as short-time output information (step S64). Afterwards, the control unit 45 performs the process of step S56. When the minimum terminal voltage Vu_min is less than or equal to the reference voltage $V_2$, the control unit 45 lowers the second maximum value Pp in the same manner as in step S3 shown in FIG. 3 (step S63). More specifically, at timing $T_1$ in FIG. 11, the control unit 45 shifts to the limitation processing mode and sets the second maximum value Pp to the same value as the initial value $Pn_0$ of the third maximum value Pn.

The process of steps S71 to S74 will now be described. The control unit 45 sets the initial value $Pn_0$ of the third maximum value Pn according to the average battery temperature (step S71). In step S71, the reference map Pn is used in the same manner as in step S11 shown in FIG. 3. Next, the control unit 45 determines whether the minimum terminal voltage Vu_min is greater than or equal to the reference voltage $V_3$ based on the voltage data provided from the voltage measurement unit 3 (step S72).

When the minimum terminal voltage Vu_min is greater than the reference voltage $V_3$, the control unit 45 provides the charging controller 41 with the third maximum value Pn set in step S71 as long-time output information (step S74). Afterwards, the control unit 45 performs the process of step S56. When the minimum terminal voltage Vu_min is less than or equal to the reference voltage $V_3$, the control unit 45 lowers the third maximum value Pn in the same manner as in step S13 (step S73). More specifically, at timing $T_1$ in FIG. 11, the control unit 45 shifts to the limitation processing mode and lowers the third maximum value Pn.

In the third embodiment, the value by which the third maximum value Pn is lowered through the first process of lowering the third maximum value Pn is preferably set according to the performance or the voltage rising speed of the rechargeable battery 10. Further, the value by which the third maximum value Pn is lowered through each of the second and subsequent processes of lowering the value is also preferably set according to the performance or the voltage falling speed of the rechargeable battery 10.

When completing the process of steps S61 to S64 and the process of steps S71 to S74, the control unit 45 determines whether the present second maximum value Pp and the present third maximum value Pn are the same (step S65). When the present second maximum value Pp and the present third maximum value Pn are the same, the control unit 45 performs step S54.

When the present second maximum value Pp and the present third maximum value Pn are not the same, the control unit 45 resets the second maximum value Pp to the same value as the third maximum value Pn (step S66). For example, at timing $T_1$ in FIG. 10, the second maximum value Pp is first lowered to the initial value $Pn_0$ of the third maximum value Pn in step S63 and then lowered to the present third maximum value Pn, which is smaller than the initial value $Pn_0$, in step S66. Afterwards, the control unit 45 performs the process of step S54.

When completing the process of steps S65 and S66, the control unit 45 determines whether the present first maximum value Ps and the present third maximum value Pn are the same (step S54).

When the present first maximum value Ps and the present third maximum value Pn are the same, the control unit 45 provides the charging controller 41 with the present first maximum value Ps and the present third maximum value Pn (step S55).

When the present first maximum value Ps and the present third maximum value Pn are not the same, the control unit 45 resets the first maximum value Ps to the same value as the third maximum value Pn (step S57).

For example, at timing $T_1$ in FIG. 11, the first maximum value Ps is first lowered to the initial value $Pn_0$ of the third maximum value Pn in step S53 and then lowered to the present third maximum value Pn, which is smaller than the initial value $Pn_0$, in step S57. Afterwards, the control unit 45 provides the charging controller 41 with the present first maximum value Ps, the present second maximum value Pp, and the present third maximum value Pn (step S55).

After step S55, the control unit 45 determines whether the present maximum voltage Vu_min is greater than or equal to the cancellation voltage $V_{cancel}$ based on the latest voltage data provided from the voltage measurement unit 3 (step S56). When the present minimum terminal voltage Vu_min is greater than or equal to the cancellation voltage $V_{cancel}$, the control unit 45 terminates the process.

When the present minimum terminal voltage Vu_min is less than the cancellation voltage $V_{cancel}$, the control unit 45 must continue limiting the output from the rechargeable battery 10. Thus, the control unit 45 performs processing from step S72 again. More specifically, the terminal voltage of the rechargeable battery 10 may increase and become greater than the reference voltage $V_3$ after the first maximum value Ps, the second maximum value Pp, or the third maximum value Pn is lowered. Thus, the control unit 45 returns to step S72 and again compares the minimum terminal voltage Vu_min with the reference voltage $V_3$.

However, when each output maximum value is insufficiently lowered, the minimum terminal voltage Vu_min may not be greater than the reference voltage $V_3$ or the minimum terminal voltage Vu_min may decrease immediately after the value becomes greater than the reference voltage $V_3$. Thus, in the third embodiment, at timings $T_2$, $T_3$, $T_4$, and $T_5$, for example, the third maximum value Pn is further lowered in a graded manner, and the first maximum value Ps and the second maximum value Pp are also lowered in a manner following the third maximum value Pn.

As described above in the third embodiment, the first maximum value Ps, the second maximum value Pp, and the third maximum value Pn are lowered until the terminal voltage of the rechargeable battery 10 is recovered, that is, reaches the cancellation voltage $V_{cancel}$. The control unit 45 performs the process shown in FIG. 10 in predetermined cycles (e.g., cycles of 100 ms). However, in the third embodiment, the control unit 45 may perform the process shown in FIG. 9 only when the terminal voltage of the rechargeable battery 10 (battery blocks) decreases to a reference voltage.

As described above, the difference between the three output maximum values is prevented from being increased. As a result, even if the power consumption of the load exceeds normal output of the power generator 40 and rapidly increases, unstable operation of the load 42 (device) is prevented.

In the third embodiment, the controller 44 may be realized by installing a program enabling execution of the process shown in FIG. 10 on a computer functioning as the battery ECU. In this case, a CPU of the microcomputer functions as the control unit 45. Further, a circuit connected to the rechargeable battery 10 (e.g., an A/D conversion circuit) and the CPU may function as the voltage measurement unit 3, a circuit connected to the current sensor (e.g., an A/D conversion circuit) and the CPU may function as the current measurement unit 32, and a circuit connected to the temperature sensors 6 (e.g., an A/D conversion circuit) and the CPU may function as the temperature measurement unit 5. Further, the microcomputer may have a memory functioning as the storage unit 4.

In the third embodiment, the charging controller 41 may function as the controller 44. In this case, the controller 44 of the third embodiment may be realized by installing a program enabling execution of the program shown in FIG. 10 in a microcomputer functioning as the charging controller 41.

It should be apparent to those skilled in the art that the present invention may be embodied in many other specific forms without departing from the spirit or scope of the invention. Particularly, it should be understood that the present invention may be embodied in the following forms.

In the first, second, and third embodiments, the minimum or maximum battery temperature specified for each battery block group may be used to control the output from the rechargeable battery 10. Further, in the first, second, and third embodiments, the average terminal voltage of the battery blocks or the terminal voltage of the entire battery pack may be used to control the output from the rechargeable battery 10.

In the first, second, and third embodiments, each output maximum value may be set according to both the battery temperature and the SOC. In this case, two-dimensional maps (the reference map Ps, the reference map Pp, and the reference map Pn) each having the battery temperature shown on its vertical axis (or horizontal axis) and the SOC shown on its horizontal axis (or vertical axis) with optimum output maximum values indicated by intersections of the vertical axis and the horizontal axis are used.

In the first, second, and third embodiments, four or more output maximum values may be used. More specifically, an n number of output maximum values, each indicating the upper limit of the charge power that is supplied to the rechargeable battery for a predetermined time (supply time of the charge power) and uniquely set for each output maximum value, may be used. In this case, it is preferable that the output maximum value be smaller as the predetermined time becomes longer. More specifically, the n number of output maximum values may be set as $P_1, P_2, \ldots, P_n$ in the order from the shortest predetermined time, and the n number of output maximum values may be set to satisfy $P_1 > P_2, \ldots, > P_n$. Further, an n number of reference voltages respectively corresponding to the n number of output maximum values are used in the first, second, and third embodiments. In this case, it is preferable that the reference voltage be lower as the output maximum value becomes greater. More specifically, the n reference voltages are referred to as $V_1, V_2, \ldots, V_n$ in the order from the largest output maximum value, and the n reference voltages may be set to satisfy $V_1 \geq V_2, \geq \ldots, \geq V_n$.

The rechargeable battery controller and the rechargeable battery output control method of the present invention are applicable to a power supply system combining an independent power supply, such as a fuel battery, a solar battery, or a power generator, with a rechargeable battery. The rechargeable battery controller and the rechargeable battery output control method of the present invention have industrial applicability.

The present examples and embodiments are to be considered as illustrative and not restrictive, and the invention is not to be limited to the details given herein, but may be modified within the scope and equivalence of the appended claims.

What is claimed is:

1. A controller for controlling output of discharge power from a rechargeable battery, the controller comprising:
   a voltage measurement unit for measuring terminal voltage of the rechargeable battery; and
   a control unit for setting a plurality of output maximum values, each indicating an upper limit for discharge power allowed to be output from the rechargeable battery during a different predetermined time, in which the output maximum values are set as $P_1, P_2, \ldots, P_n$ in order from shortest to longest of predetermined times and satisfy $P_1 > P_2, \ldots, > P_n$, where n is a number of the output maximum values;
   wherein the control unit compares the terminal voltage of the rechargeable battery with a plurality of reference voltages respectively corresponding to the plurality of output maximum values, the control unit is configured to lower each output maximum value when the terminal voltage of the rechargeable battery decreases to the corresponding reference voltage, the reference voltages are set as $V_1, V_2, \ldots, V_n$ in order from largest to smallest of the output maximum values and satisfy $V_1, V_2, \ldots, V_n$;
   wherein the plurality of output maximum values includes a first output maximum value, which is an upper limit for discharge power allowed to be output from the rechargeable battery during a first predetermined time, and a second output maximum value, which is smaller than the first output maximum value and which is an upper limit for discharge power allowed to be output from the rechargeable battery during a second predetermined time longer than the first predetermined time; and
   the plurality of reference voltages includes a first reference voltage, which corresponds to the first output maximum value, and a second reference voltage, which corresponds to the second output maximum value and is less than or equal to the first reference voltage.

2. The controller according to claim 1, wherein the controller is connected to a device using the rechargeable battery, and the control unit transmits the plurality of output maximum values to the device.

3. The controller according to claim 1, wherein the controller is for installation in a vehicle having an internal combustion engine and a motor as a power source, and the rechargeable battery is installed in the vehicle and discharges power supplied to the motor.

4. The controller according to claim 1, wherein the control unit sets an initial value for the first output maximum value and an initial value for the second output maximum value, which is smaller than the initial value of the first output maximum value, and the control unit lowers the first output maximum value to the second output maximum value when the terminal voltage of the rechargeable battery decreases to the first reference voltage.

5. The controller according to claim 1, wherein the control unit sets an initial value for the first output maximum value and an initial value for the second output maximum value, which is smaller than the initial value of the first output maximum value, and lowers the first output maximum value in a graded manner when the terminal voltage of the rechargeable battery decreases to the first reference voltage.

6. The controller according to claim 5, wherein the control unit lowers the first output maximum value to a value equal to the second output maximum value when the terminal voltage of the rechargeable battery decreases to the second reference voltage.

7. The controller according to claim 5, wherein the control unit cancels graded lowering of the first output maximum value and lowers the first output maximum value to a value equal to the second output maximum value before the terminal voltage of the rechargeable battery decreases to the second reference voltage.

8. The controller according to claim 1, further comprising:
   a temperature measurement unit for measuring temperature of the rechargeable battery, wherein the control unit is configured to set the plurality of output maximum values according to the temperature measured by the temperature measurement unit.

9. The controller according to claim 1, wherein the control unit obtains a state of charge of the rechargeable battery and sets the plurality of output maximum values according to the obtained state of charge.

10. The controller according to claim 1, wherein:
    the rechargeable battery includes a plurality of battery blocks that are electrically connected in series, with each battery block including a plurality of cells that are electrically connected in series;
    the voltage measurement unit measures terminal voltage of each battery block; and
    the control unit is configured to lower the first output maximum value when a smallest one of the terminal voltages of the battery blocks decreases to the first reference voltage and lowers the second output maximum value when the smallest one of the terminal voltages decreases to the second reference voltage.

11. A method for controlling output of discharge power from a rechargeable battery, the method comprising:
    measuring terminal voltage of the rechargeable battery;
    setting a plurality of output maximum values, each indicating an upper limit for discharge power allowed to be output from the rechargeable battery during a different predetermined time, wherein the output maximum values are set as $P_1, P_2, \ldots, P_n$ in order from shortest to longest of predetermined times and satisfy $P_1 > P_2, \ldots, > P_n$, where n is a number of the output maximum values, wherein the plurality of output maximum values includes a first output maximum value, which is an upper limit for discharge power allowed to be output from the rechargeable battery during a first predetermined time, and a second output maximum value, which is smaller than the first output maximum value and which is an upper limit for discharge power allowed to be output from the rechargeable battery during a second predetermined time that is longer than the first predetermined time;

comparing the terminal voltage of the rechargeable battery with a plurality of reference voltages respectively corresponding to the plurality of output maximum values; and lowering each output maximum value when the terminal voltage of the rechargeable battery decreases to the corresponding reference voltage wherein the reference voltages are set as $V_1, V_2, \ldots, V_n$ in order from largest to smallest of the output maximum values and satisfy $V_1, V_2, \ldots, V_n$, wherein the plurality of reference voltages includes a first reference voltage, which corresponds to the first output maximum value, and a second reference voltage, which corresponds to the second output maximum value and is less than or equal to the first reference voltage.

12. The method according to claim 11, wherein:

the rechargeable battery is installed in a vehicle having an internal combustion engine and a motor as a power source; and said setting a plurality of output maximum values includes setting the plurality of output maximum values as upper limits for the discharge power allowed to be output from the rechargeable battery to the motor.

13. A computer-readable product encoded with program instructions for execution by a computer for controlling output of discharge power from a rechargeable battery, the program instructions when executed by a computer performing steps including:

measuring terminal voltage of the rechargeable battery;

setting a plurality of output maximum values, each indicating an upper limit for discharge power allowed to be output from the rechargeable battery during a different predetermined time, wherein the output maximum values are set as $P_1, P_2, \ldots, P_n$ in order from shortest to longest of predetermined times and satisfy $P_1 > P_2, \ldots, > P_n$, where n is a number of the output maximum values, wherein the plurality of output maximum values includes a first output maximum value, which is an upper limit for discharge power allowed to be output from the rechargeable battery during a first predetermined time, and a second output maximum value, which is smaller than the first output maximum value and which is an upper limit for discharge power allowed to be output from the rechargeable battery during a second predetermined time that is longer than the first predetermined time;

comparing the terminal voltage of the rechargeable battery with a plurality of reference voltages respectively corresponding to the plurality of output maximum values; and lowering each output maximum value when the terminal voltage of the rechargeable battery decreases to the corresponding reference voltage, wherein the reference voltages are set as $V_1, V_2, \ldots, V_n$ in order from largest to smallest of the output maximum values and satisfy $V_1, V_2, \ldots, V_n$, wherein the plurality of reference voltages include a first reference voltage, which corresponds to the first output maximum value, and a second reference voltage, which corresponds to the second output maximum value and is less than or equal to the first reference voltage.

14. The computer-readable product according to claim 13, wherein:

the rechargeable battery is installed in a vehicle having an internal combustion engine and a motor as a power source; and said setting a plurality of output maximum values includes setting the plurality of output maximum values as upper limits for the discharge power allowed to be output from the rechargeable battery to the motor.

* * * * *